US009500670B2

(12) United States Patent
Lim et al.

(10) Patent No.: US 9,500,670 B2

(45) Date of Patent: Nov. 22, 2016

(54) METHOD AND DEVICE FOR CONTROLLING A SCANNING PROBE MICROSCOPE

(71) Applicant: UNIVERSITAT BASEL, Basel (CH)

(72) Inventors: Roderick Lim, Riehen/Basel (CH); Marija Plodinec, Basel (CH); Marko Loparic, Basel (CH); Pascal Oehler, Buchs (CH); Leon Camenzind, Basel (CH)

(73) Assignee: UNIVERSITAT BASEL, Basel (CH)

( * ) Notice: Subject to any disclaimer, the term of this patent is extended or adjusted under 35 U.S.C. 154(b) by 0 days.

(21) Appl. No.: 14/651,233

(22) PCT Filed: Dec. 12, 2013

(86) PCT No.: PCT/EP2013/076461

§ 371 (c)(1), (2) Date: Jun. 11, 2015

(87) PCT Pub. No.: WO2014/090971

PCT Pub. Date: Jun. 19, 2014

(65) Prior Publication Data

US 2015/0369838 A1 Dec. 24, 2015

(30) Foreign Application Priority Data

Dec. 12, 2012 (WO) ................ PCT/EP2012/075295

(51) Int. Cl.

| | |
|---|---|
| ***B82Y 35/00*** | (2011.01) |
| ***G01Q 40/00*** | (2010.01) |
| ***G01Q 30/06*** | (2010.01) |
| ***G01Q 20/00*** | (2010.01) |
| ***G01Q 10/06*** | (2010.01) |
| ***G01Q 10/00*** | (2010.01) |

(52) U.S. Cl.

CPC ............. *G01Q 20/00* (2013.01); *G01Q 10/00* (2013.01); *G01Q 10/065* (2013.01); *G01Q 30/06* (2013.01)

(58) Field of Classification Search

CPC .... B82Y 35/00; G01Q 40/00; G01Q 10/065; G01Q 30/06; Y10S 977/863; Y10S 977/85; Y10S 977/852; Y10S 977/872

USPC ...... 250/306, 307, 234; 850/62, 1, 10, 26, 3, 850/33, 40, 6, 63

See application file for complete search history.

(56) References Cited

U.S. PATENT DOCUMENTS

| | | | | |
|---|---|---|---|---|
| 5,426,302 | A * | 6/1995 | Marchman | B82Y 20/00 250/307 |
| 6,545,492 | B1 * | 4/2003 | Altmann | B82Y 35/00 850/3 |
| 6,552,339 | B1 * | 4/2003 | Gupta | B82Y 35/00 250/306 |
| 6,661,004 | B2 * | 12/2003 | Aumond | B82Y 35/00 250/306 |
| 7,473,887 | B2 * | 1/2009 | Miles | B82Y 35/00 250/234 |
| 8,756,711 | B2 * | 6/2014 | Plodinec | G01Q 60/38 850/21 |
| 9,244,095 | B2 * | 1/2016 | Plodinec | B82Y 35/00 |
| 2006/0283240 | A1 | 12/2006 | Struckmeier et al. | |
| 2007/0220958 | A1 | 9/2007 | Gotthard et al. | |
| 2008/0245139 | A1 | 10/2008 | Morimoto et al. | |
| 2014/0152801 | A1 * | 6/2014 | Fine | H04N 7/18 348/79 |

FOREIGN PATENT DOCUMENTS

| | | |
|---|---|---|
| JP | 2000088773 | 3/2000 |
| JP | 2000097840 | 4/2000 |

* cited by examiner

*Primary Examiner* — David A Vanore

(74) *Attorney, Agent, or Firm* — JMB Davis Ben-David

(57) ABSTRACT

The present invention relates to a method for controlling a scanning probe microscope having a probe (2) with a tip (21) for interacting with a sample (4), and a nanoscanner (1) for retaining the sample (4) or the probe (2), comprising the steps of monitoring the extension of the piezo element (1) along a first direction (R) along which the tip (21) is moved towards the sample (4), and adjusting the level of the probe (2) along the first direction (R) by means of an additional actuator (3), when the nanoscanner (1) exhibits an extension below or above a threshold value. The invention further relates to a device (100) for controlling a scanning probe microscope.

9 Claims, 24 Drawing Sheets

Prior Art

Prior Art

Prior Art

Fig. 4
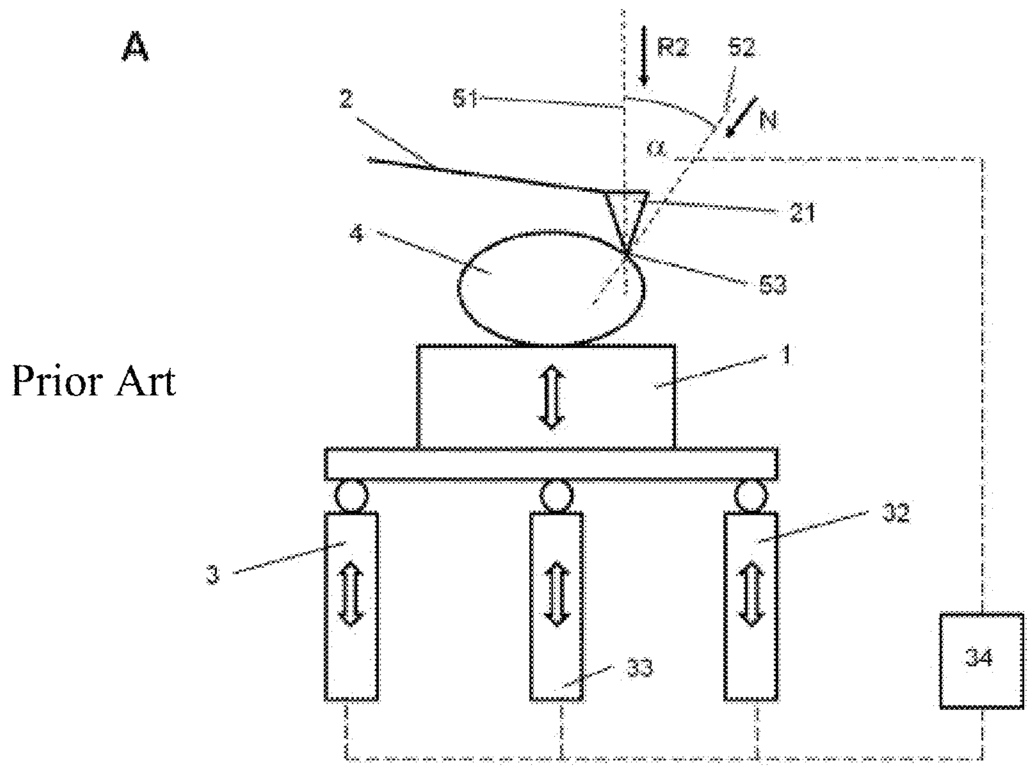
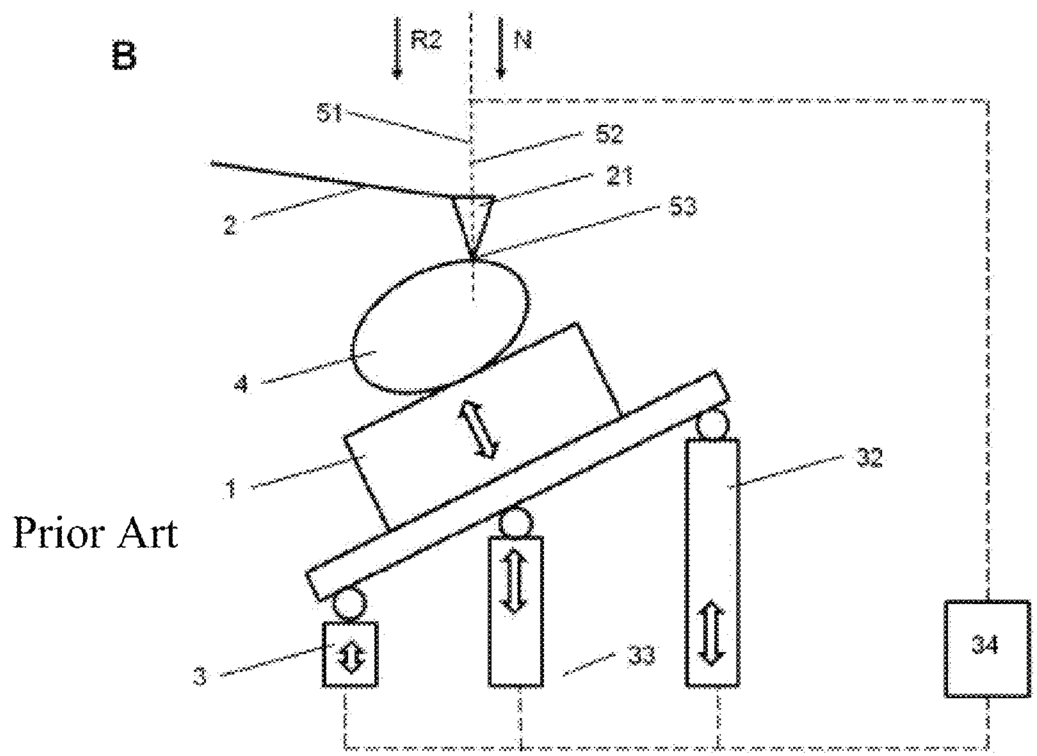

Prior Art

Figure 12
A
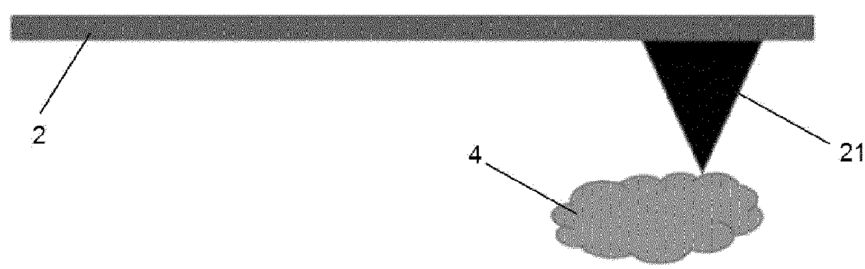
B
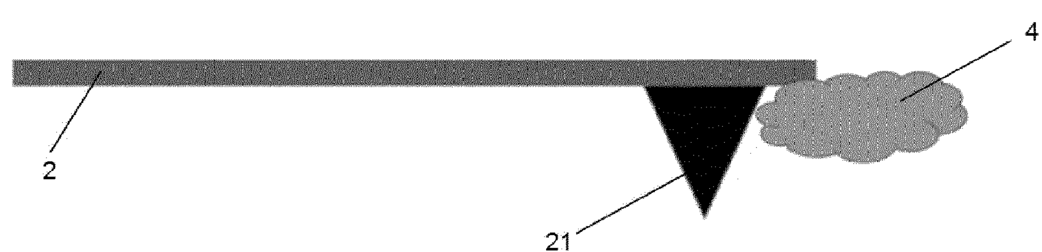
C
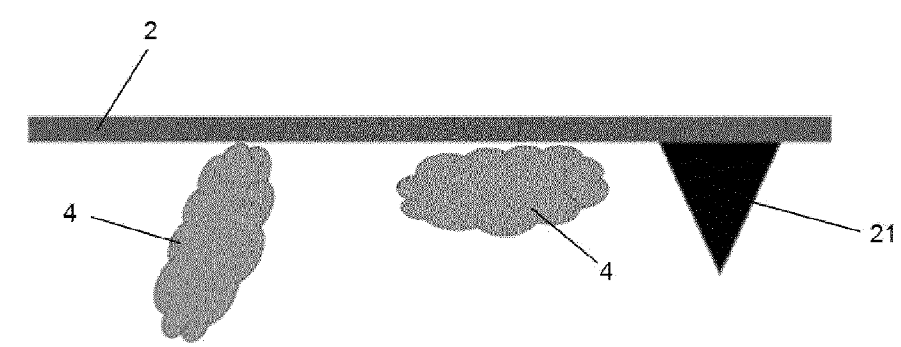

Figure 16
A
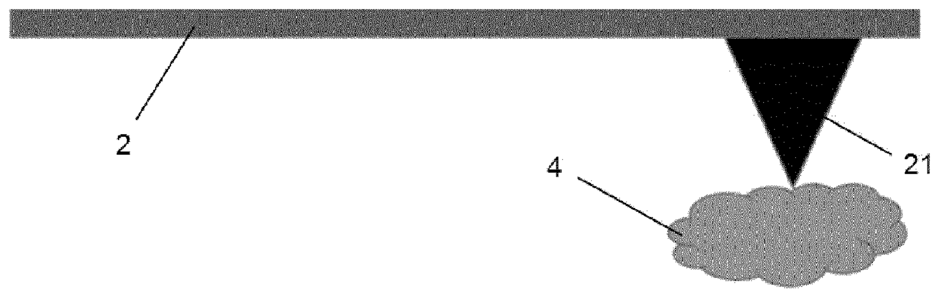
B
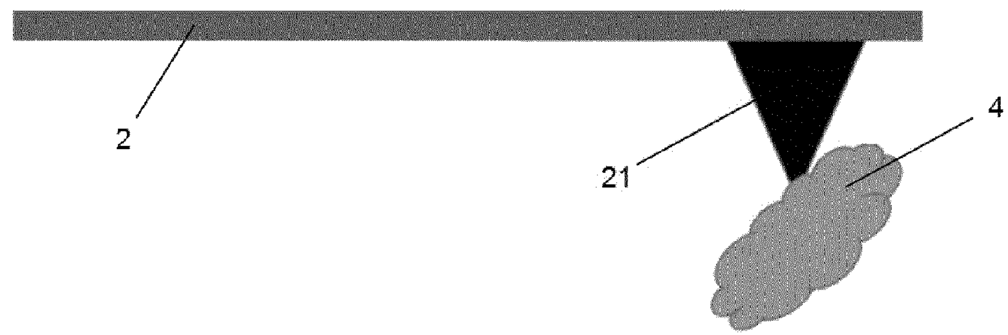
C
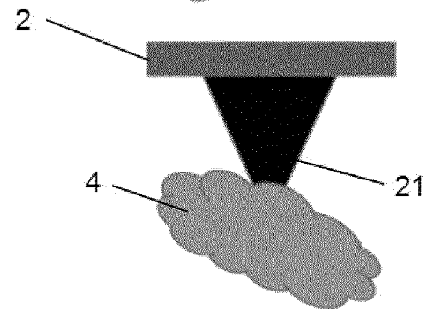

METHOD AND DEVICE FOR CONTROLLING A SCANNING PROBE MICROSCOPE

CROSS-REFERENCE TO RELATED APPLICATIONS

This is the U.S. National Stage of International Application No. PCT/EP2013/076461, filed Dec. 12, 2013, which was published in English under PCT Article 21(2), which in turn claims the benefit of International Patent Application No. PCT/EP2012/075295, filed Dec. 12, 2012.

The present invention relates to a method and a device for controlling a scanning probe microscope.

Scanning probe microscopy and particularly atomic force microscopy (AFM) are valuable methods in life sciences. AFM-based indentation testing is an important technique for inspecting mechanical properties of a great variety of samples. Biological tissue samples, however, comprise surface features that give rise to large surface roughness. This roughness can exceed the maximal range of the vertical movement or extension of a nanoscanner ("nanoscanner" is used in the following as a generalized term for a piezo element, voice coil motor or similar device that controls the scanning probe microscope).

Such nanoscanners, in particular piezo elements, usually exhibit a range of motion that can vary between 5 μm and 100 μm depending on manufacturer design. The main role of the nanoscanner is to maintain a user-specified interaction force between the probe tip, more precisely a cantilever tip, and the sample under examination by vertically lifting or lowering the cantilever (TOP-DOWN setup) or sample (BOTTOM-UP setup). In the TOP-DOWN setup, the cantilever or cantilever assembly is directly coupled to the piezo element. The sample or the sample holder does not move. In the BOTTOM-UP setup, the sample or the sample holder is directly coupled to the piezo element. The cantilever assembly remains stationary. Alternatively, the sample may be moved in the vertical direction by a piezo element (BOTTOM-UP), while the cantilever is moved by an additional piezo element in horizontal direction (TOP-LATERAL). Or, in a yet another configuration, the cantilever may be moved in the vertical direction by a piezo element (TOP-DOWN), while the sample is moved by an additional piezo element in horizontal direction (BOTTOM-LATERAL).

In this manner, the nanoscanner maintains a constant tip-sample force during sample scanning (i.e. force mapping) by moving the sample or the cantilever in the vertical direction. Force curves are usually recorded on, but not limited to, scanning areas ranging from 10 μm×10 μm to 150 μm×150 μm on neighbouring indentation spots with a spacing of about 1 μm. To record force curves, the nanoscanner extends (cantilever is going towards the sample) until the cantilever is bent to reach a given force on the sample. This yields the 'trace' curve. Subsequently, the nanoscanner retracts a certain distance, yielding the 'retrace' curve and then moves on to the next indentation spot.

Biological samples are very challenging for nano-indentation due to the often substantial roughness. There are four major issues. First, the cantilever is indenting sample with parts other than tip. Second, the tip is approaching not optimally to the sample surface. Third, different structures across sample exhibit different indentation and adhesion properties which require dynamic piezo range adjustment in order to ensure convenient measurements (fast and accurate). Fourth, the sample is too rough for the vertical range of the cantilever movement.

Problems occur when the corrugations (sample unevenness in the z-axis) of the sample surface on the scanning area are larger than the range of the given nanoscanner in the z-axis (5 μm to 100 μm). Hence, in case of a TOP-BOTTOM setup, if the corrugations are too large, the piezo element will either extend or retract completely. The cantilever will lose contact if the piezo element is fully extended but the sample surface is still descending. On the other hand, the force of the cantilever will increase over the given force maximum if the piezo element is already fully retracted but the sample surface is still ascending. The cantilever tip is then literally pressed into the sample surface. In both cases, the above mentioned constant tip-sample force is not maintained. For BOTTOM-UP setups, the directions are reversed.

Based on this background it is the objective of the present invention to provide methods and means for controlling a scanning probe microscope, in a particular for measurements of samples characterized by large surface corrugations or roughness.

The solution provided by the present invention is to monitor the movement or extension of the piezo element and shift the relative or absolute height level of the cantilever by external motors or actuators when the piezo element reaches its limits, or when it is within a predefined range in proximity to these limits. An additional module was developed that allows for the indentation testing of very rough samples. On every single indentation spot, the complete movement or extension of the nanoscanner was recorded and analysed.

According to one aspect of the invention, a method for controlling a scanning probe microscope having a probe with a tip for interacting with a sample and a nanoscanner for retaining the sample or the probe is provided, comprising the steps of:

- monitoring the extension of the nanoscanner along a first direction (z-axis) along which the tip is moved towards the sample, and
- adjusting a level of the probe along the first direction by means of an additional actuator, when the nanoscanner exhibits an extension below or above a threshold value.

Such scanning probe microscope is configured to form images or maps of sample surfaces using a physical probe that scans the sample. Such images may be obtained by mechanically moving the probe in a raster scan, along a line or a grid of points and registering the probe-surface interaction.

In some embodiments, the scanning probe microscopes is selected from the group comprised of an atomic force microscope, a chemical force microscope, a conductive atomic force microscope, a scanning tunneling microscope and a magnetic force microscope.

In some embodiments, the scanning probe microscope has a resolving power of at least 1 μm. Resolving power in the context of the present specification refers to the minimal distance between points by which a scanning probe microscope is still able to discriminate between two points on a sample regarding their probed characteristics such as charge, magnetisation or a mechanical property. A resolving power of at least 1 μm means that the microscope is able to discriminate two points that are not more than 1 μm apart. A resolving power of at least 1 μm also encompasses higher resolving powers. A resolving power higher than 1 μm means that the microscope can discriminate two points having a distance smaller than 1 μm. Examples of resolving powers higher than 1 μm are 0.5 μm, 0.1 μm, 10 nm and 1 nm.

In some embodiments, such probe is configured to interact with a sample by electrons or forces such as van-der-Waals force, mechanical force, electrostatic force, adhesion force, frictional force or magnetic force.

In some embodiments, the probe is configured to register the interaction between the sample and the probe by detecting, for example electric currents, differences in electrical or chemical potentials, changes in the electrostatic capacitance or forces as described above.

In some embodiments, the probe is selected from the group comprised of a conductive scanning tip, a cantilever and an optical fibre.

In some embodiments, the probe can further be moved in a second and third direction (x-axis and y-axis) that extend orthogonally to the first direction (z) and is configured to scan the sample surface along the second or third direction (i.e. in the x-y plane).

In some embodiments, the probe is part of a probe assembly.

In some embodiments, such adjusting a level of the probe along the first direction is configured to prevent the probe tip from coming too close to the sample or from being too far away from the sample.

In some embodiments, adjustments are performed by lowering or lifting the probe or lowering a lifting the sample along the first direction.

In some embodiments, the sample is retained by a sample holder. A sample holder in the context of the present specification means a device or a support that is configured to retain a sample.

In some embodiments, the sample holder is a glass slide, a petri dish or a Teflon support.

A nanoscanner in the context of the present specification refers to a device for moving the sample or the probe with sub-micrometer or at least micrometer precision along the first direction described above. Submicrometer or micrometer precision in the context of the present specification means that the device can move the sample of the probe along the first direction in steps of not larger than 0.1 μm, 0.5 μm, 1 μm, 2 μm, 5 μm, 7 μm or 10 μm.

In some embodiments, the nanoscanner is a piezo element or a linear motor such as voice coil motor.

A piezo element in the context of the present specification refers to a body composed of a piezoelectric material that can be deformed by application of an electric current. Such piezo element is extendable and retractable along at least one direction.

In some embodiments, the piezo element is made of a suitable material such as crystal or ceramics, for example quartz, barium titanate, lead titanate, sodium tungstate, sodium niobate, lead zirconate titanate or bismuth ferrite.

In some embodiments, the piezo element is extendable or retractable within a range of 5, 10, 15, 20, 25, 30, 35, 40, 50, 60, 70, 80, 90 or 100 μm.

A voice coil motor in the context of the present specification refers to a motor comprising a magnetic housing and an electromagnetic coil that are movable in each other (the coil inside of the housing). Such electromagnetic coil comprises a conductive wire wound around a core. The application of a voltage across the terminals of the motor causes the motor to move to one direction, while reversing the polarity of the applied voltage will move the motor to the opposite direction. The extension of a voice coil motor in the context of the present specification refers to its stroke or lift, wherein the maximal extension refers to the maximal stroke or lift and the minimal extension to zero stroke or lift.

In some embodiments, the magnetic housing comprises a permanent magnet in a housing composed of iron.

In some embodiments, the voice coil motor additionally comprises a flexure hinge structure which may be used as a spring between the probe and the housing.

In some embodiments, the nanoscanner is directly coupled to the probe or to the probe assembly (TOP-DOWN setup).

In some embodiments, the nanoscanner is directly coupled to the sample or the sample holder (BOTTOM-UP setup).

Directly coupling in the context of the present specification refers to a physical connection between the nanoscanner and the probe, the probe assembly, the sample or the sample holder, wherein the physical connection is configured to enable the nanoscanner to move the probe, probe assembly, sample of sample holder in at least the first direction as described above.

In some embodiments, the nanoscanner is configured to move the probe, probe assembly, sample or sample holder in the second and third direction described above.

In some embodiments, such threshold value corresponds to the optimal working range of the nanoscanner, in particular of a piezo element, depending on construction, design or used material of the nanoscanner.

In some embodiments, the threshold value corresponds to the upper and lower limit of the nanoscanner optimal working range.

An actuator in the context of the present specification means a device for moving or controlling a mechanism or system different from the piezo element described above and which converts energy into motion.

In some embodiments, such actuator is operated by a source of energy such as electric current, hydraulic fluid pressure or pneumatic pressure.

In some embodiments, the actuator is selected from the group comprised of a pneumatic actuator, a hydraulic actuator, a piezoelectric actuator, a comb drive, a linear actuator or motor, an electroactive polymer or an electric motor such as servo motor, stepper motor or voice coil motor.

In one embodiment, the nanoscanner is designed—with respect to its extension—to maintain a constant probe tip-sample interaction force. Such force has been described above.

In one embodiment, the extension of the nanoscanner is configured to maintain a constant probe tip-sample distance.

In one embodiment, the extension of the nanoscanner is configured to maintain a constant indentation depth of the probe tip into the sample.

In one embodiment, the method according the above aspect and/or embodiments of the invention is performed in a measurement of a surface characterized by corrugations larger than the extension range of a given piezo element.

In one embodiment, the method is performed in a measurement of surface characterized by a corrugation larger than 5 μm, 10 μm, 15 μm, 20 μm, 25 μm, 30 μm, 35 μm, 40 μm, 50 μm, 60 μm, 70 μm, 80 μm, 90 μm or 100 μm.

In one embodiment, monitoring the extension of the nanoscanner according to the aspect and/or embodiments of the invention is performed in real time. Real time in the context of the present specification means that the time elapsing between extension of the nanoscanner and registration of the extension is not larger than 1 s, 0.1 s, 10 μs or 1 μs. A real time monitoring can enable a real time adjusting of the level of the probe, wherein the time elapsing between extension of the piezo element and adjusting the level of the probe is not larger than 1 μs, 10 μs, 100 μs, 1 s or 5 s.

In one embodiment, the probe described above is a cantilever.

A cantilever in the context of the present specification means a beam or arm that is anchored at only one end. Deflections of the cantilever caused by repulsive or attractive forces between the sample surface and the tip may be optically detected, for example by an interferometer or by a laser focused on the cantilever back, and reflected onto a split photodiode, wherein the photodiode registers the deflection of the cantilever as a voltage difference, which can be converted into nanometers. Alternatively, the deflection of the cantilever may be detected by a piezoelectric sensor, wherein the strain of the cantilever is converted into an electrical charge.

In one embodiment, the cantilever is part of a cantilever assembly.

In one embodiment, the cantilever is configured in a way that the tip of the cantilever is pressed towards the sample along the first direction described above by extension of the nanoscanner.

In some embodiments, the scanning probe microscope is an atomic force microscope having the cantilever.

In some embodiments, the method is used to perform AFM measurement on a sample surface that characterized by roughness or large corrugations.

In one embodiment, the method is used for AFM measurement of tissue samples such as biopsy samples.

In one embodiment, adjusting the level of the probe according to the above aspect and/or embodiments of the invention is performed by lowering or lifting the probe or lowering or lifting the sample.

In some embodiments, lowering or lifting according to the above embodiment is performed by directly coupling an actuator as described to the sample, the sample holder, the probe or the probe assembly, wherein the actuator is configured to move the sample, sample holder, the cantilever or the cantilever assembly along the first direction as described above.

In one embodiment, adjusting the level of the probe according to the above aspect and/or embodiments of the invention is automatically performed.

In one embodiment, such automatically adjusting is performed by the actuator described above or a programmed microprocessor that is configured to run the method according to any aspects or embodiments of the invention.

In one embodiment, the microprocessor is integrated into a device for scanning probe microscopy or is part of the actuator described above, a controller or a computer for operating the device.

In one embodiment, the programmed microprocessor is configured to monitor the extension of the piezo element and automatically start the actuator to adjust the level of the probe or the sample, when a defined threshold of extension is reached. The microprocessor is further configured to automatically stop the actuator, when a certain lowering or lifting distance along the first direction is reached.

In one embodiment, the level of the probe is adjusted, when the nanoscanner exhibits an extension lower than 5%, 10%, 15%, or 20% or higher than 80%, 85%, 90% or 95% of its maximal extension. Such embodiment offers the advantage of keeping the extension of the nanoscanner in the optimal working range between 5%, 10%, 15% or 20% and 80%, 85%, 90% or 95% of the maximal extension. At 0% of the maximal extension the nanoscanner is maximally retracted.

Maximal extension in the context of the present specification means the maximal length of a nanoscanner to which the nanoscanner can be extended by application of an electric current. Likewise, minimal extension or maximal retraction in the context of the present specification refers to minimal length of a nanoscanner to which the nanoscanner can be retracted by application of an electric current.

In one embodiment, the level of the probe is adjusted by lowering or lifting the probe or the sample by 5 to 30% of the maximal extension of the nanoscanner. Such embodiment offers the advantage of restoring the optimal working range of the piezo element.

In one embodiment, the level of the probe is adjusted by lowering or lifting the probe or the sample by 20% of the maximal extension of the piezo element.

In one embodiment, the level of the probe is adjusted, when the nanoscanner exhibits an extension that is 50 nm, 100 nm, 200 nm, 500 nm, 700 nm, 1μ, or 2 μm before the maximal extension or that is 50 nm, 100 nm, 200 nm, 500 nm, 700 nm, 1μ, or 2 μm before the maximal retraction. Such embodiment offers the advantage of keeping the extension of the nanoscanner in the optimal working.

In one embodiment, the level of the probe is adjusted by lowering or lifting the probe or the sample by at least 50 nm.

In one embodiment, the level of the probe is adjusted by lowering or lifting the probe or the sample by 3 μm. Such embodiment offers the advantage of restoring the optimal working range of the piezo element.

In some embodiments, the method of the invention further comprises the steps of:

- monitoring a current angle between a second direction and the normal of a surface of the sample at a point of the surface, wherein the probe is moving along the second direction towards the point, and
- controlling the additional actuator and at least a second additional actuator such that the current angle approaches a predefined desired angle, wherein particularly the predefined desired angle is zero.

A normal to a surface at a point in the context of the present specification refers a line or a vector that is perpendicular to the surface of the sample at this point. In particular, the normal to a surface at a point is the same as a normal to the tangent plane to that surface at this point.

One advantage of the above described embodiment is the possibility to achieve an optimal, constantly perpendicular approach of the probe, particularly of the probe tip, towards the surface of a sample during a scanning probe microscopic measurement of a rough, uneven sample with a curved surface.

In some embodiments, the current angle is monitored by measuring both vertical and lateral (horizontal) deflections of the probe, wherein the deflections are monitored by an interferometer or by a laser focused on the probe back, and reflected onto a split photodiode, and wherein the photodiode registers the deflection of the probe as a voltage difference.

In some embodiments, the current angle is detected from the shape of a recorded vertical indentation force curve.

In some embodiments, the additional actuator, the second additional actuator and a third additional actuator are controlled such that the current angle approaches the predefined desired angle.

In one embodiment, the controlling of the additional actuator, the second additional actuator, and particularly also of the third additional actuator, is automatically performed.

In one embodiment, such automatically controlling is performed by the additional actuator, the second additional, and particularly also by the third additional actuator described above or by a programmed microprocessor that is configured to run the method according to any aspects or embodiments of the invention.

In some embodiments, the method of the invention further comprises the steps of:

a) measuring a force curve on the sample, wherein the force curve comprises an approaching curve and a retracting curve,
b) detecting an optimal baseline part of the force curve,
c) optionally, detecting a contact point of the force curve,
d) comparing the approaching curve and/or the retracting curve with the optimal baseline part, particularly in proximity of the contact point, and
e) adjusting one of:
   the level (vertical position) of the probe,
   the lateral position (horizontal position) of the probe, or the angle,
   based on the comparison of the approaching curve and/or the retracting curve with the optimal baseline part.

In some embodiments, at least one of steps a) to e) is performed automatically. In some embodiments, all of steps a) to e) are performed automatically.

The term "optimal baseline part" in the context of the present specification particularly refers to the part of the force curve, wherein substantially no deflection is measured with increasing actuator displacement. The optimal baseline part is particularly the part of the force curve showing the best linear fit.

The term "contact point" in the context of the present specification particularly refers to the actuator displacement, where the tip of the cantilever is contacting the sample. Before the contact point the tip is not contacting the sample. Beyond the contacting point the tip is indenting the sample.

The term "in proximity of the contact point" in the context of the present specification particularly refers to a range of piezo displacement around the contact point. In some embodiment, the range is from value which corresponds to 50% of the baseline before contact point to value which correspond to 20% of indentation depth after the contact point.

In some embodiments, the distance between approaching curve and the retracting curve within the optimal baseline part and in proximity of the contact point is determined, wherein if the distance between the approaching curve and the retracting curve is in the proximity of the contact point at least two times larger as within the optimal baseline part a cantilever part other than the tip is indenting the sample and the cantilever is moved forward along the cantilever axis, wherein the cantilever axis extends parallel to the sample surface.

The term "beyond the contact point" in the context of the present specification refers to an actuator displacement, in which the tip of the cantilever is already indenting the sample, and particularly a deflection of the cantilever can be observed.

In some embodiments, the shape of the approaching curve and/or of the retracting curve is analysed, particularly beyond the contact point, wherein if the approaching curve and/or the retracting curve exhibits two or more phases of deflection (or in other word show one or more kinks) or is characterized by two or more functions of the deflection beyond the contact point, the cantilever approaches to the tip in a non-optimal angle to the sample and the angle is correct.

In some embodiments, the initial segment of the approaching curve and/or the final segment of retracting curve is compared to the optimal baseline part, wherein if the initial segment at an actuator displacement of larger than 500 nm is not essentially equal to the optimal baseline part or shows a trend of decreasing deflection down to 900 nm within 3 indentation cycles, the level of the cantilever is adjusted.

According to a further aspect of the invention, a method for controlling a scanning probe microscope having a probe with a tip for interacting with a sample and a nanoscanner for retaining the sample or the probe is provided, comprising the steps of:

- monitoring a current angle between a direction and the normal of the surface of the sample at a point, wherein the probe is moving along the direction towards the point, and
- controlling a first additional actuator and at least a second additional actuator such that the current angle approaches a predefined desired angle, wherein particularly the predefined angle is zero.

The above described further aspect may be combined with any of the embodiments of the first aspect of the invention described above.

According to another aspect of the invention, a scanning probe microscope device is provided, comprising

- a probe having a tip for interacting with a sample, wherein the probe is configured to move the tip towards the sample along a first direction,
- a nanoscanner for retaining the sample or the probe, wherein the scanning probe microscopy device comprises a means for monitoring the extension of the nanoscanner along the first direction as described above, an actuator for adjusting a level of the probe along the first direction and a controller for controlling the actuator, wherein the controller is configured to control the actuator so as to adjust the level of the probe, when the nanoscanner exhibits an extension below or above a definable threshold value.

The terms nanoscanner, probe, actuator, first direction and threshold value have the same meaning as described above.

In some embodiments, the actuator is configured to lower or lift the sample or the probe to prevent the probe tip from coming to close to the sample or from being to far way from the sample.

In some embodiments, such means for monitoring the extension of the nanoscanner is an optical system comprising a laser or an interferometer, a piezo electric sensor, which can register the movement of the piezo element as an electrical charge, or a sensor which is monitoring not only applied voltage but also the consequent real extension in order to ensure high precision of the extension.

In some embodiments, such means for monitoring the movement is the reading of the voltage or the electric current applied to the nanoscanner, which is necessary to move the nanoscanner along the first direction or, in particular, to maintain a constant force between tip and sample. For example, each piezo has specific sensitivity—nm/V which is used to convert applied voltage to the piezo distance/movement. When the applied voltage or electric current and resulting nanoscanner extension reach a specific level, then the adjusting the level of the probe as described above is activated.

A controller in the context of the present specification refers to a control unit that is connected to the actuator.

In some embodiments, the controller is a microprocessor or a computer.

In some embodiments, the nanoscanner is directly coupled to the probe or the sample. In case of the probe is part of a probe assembly, the nanoscanner alternatively may be directly coupled to the probe assembly.

In one embodiment, the nanoscanner is configured to maintain a constant probe tip-sample interaction force. Such force has been described above.

In one embodiment, the nanoscanner is configured to maintain a constant indentation depth of the probe tip into the sample.

In one embodiment, the nanoscanner is a piezo element. The term piezo element has the same meaning as described above.

In one embodiment, the probe is a cantilever. The term cantilever has the same meaning as described above.

In one embodiment, the nanoscanner is movable in a second direction which extends orthogonal to the said first direction described above.

In one embodiment, the device further comprises a sample holder for retaining the sample. The term sample holder has the same meaning as described above. In case of the sample is retained by the sample holder, the nanoscanner may be directly coupled to the sample holder.

In one embodiment, the device of the invention further comprises at least a second additional actuator, wherein in particular the additional actuator and the second additional actuator are configured to adjust a current angle between a second direction and the normal of a surface of the sample at a point of the surface, wherein the probe is configured to move along the second direction towards the point.

In one embodiment, the device of the invention further comprises a third additional actuator, wherein in particular the additional actuator, the second additional actuator and the third additional actuator are configured to adjust an angle between the second direction and the normal.

In one embodiment, the device of the invention further comprises an actuator control unit being configured to control the additional actuator, the second additional actuator, and particularly also the third additional actuator, such that the angle approaches a desired angle, wherein particularly the desired angel is zero.

In one embodiment, the actuator control unit is configured to monitor the angle between the second direction and the normal.

One advantage of the above described embodiments is that such device allows a scanning probe microscopic measurement, in particular an AFM-measurement, of a rough, uneven sample with a curved surface with an optimal, constantly perpendicular approach of the probe towards the sample surface.

Wherever alternatives for single separable features such as, for example, a probe, a nanoscanner or a scanning probe microscope are laid out herein as “embodiments”, it is to be understood that such alternatives may be combined freely to form discrete embodiments of the invention disclosed herein.

The invention is further characterized by the following figures and examples, from which further features, advantages and embodiments of the invention can be derived:

DESCRIPTION OF THE FIGURES

FIG. 4 shows a scheme of an embodiment of the invention with an AFM-BOTTOM-UP setup and with components for angle adjustment with: A-situation before angle adjustment; and B-situation after angle adjustment.

FIG. 12 shows a scheme of a cantilever that is indenting a sample with A: front part of the cantilever; B: indentation tip (optimal); and C: back part of the cantilever.

FIG. 16 shows a scheme of a cantilever, wherein the tip of the cantilever approaches to the sample with A: optimal indentation; B with a step angle the cantilever axis; and C: with a step angle perpendicular to the cantilever axis.

EXAMPLES

Example 1

Figure 1:
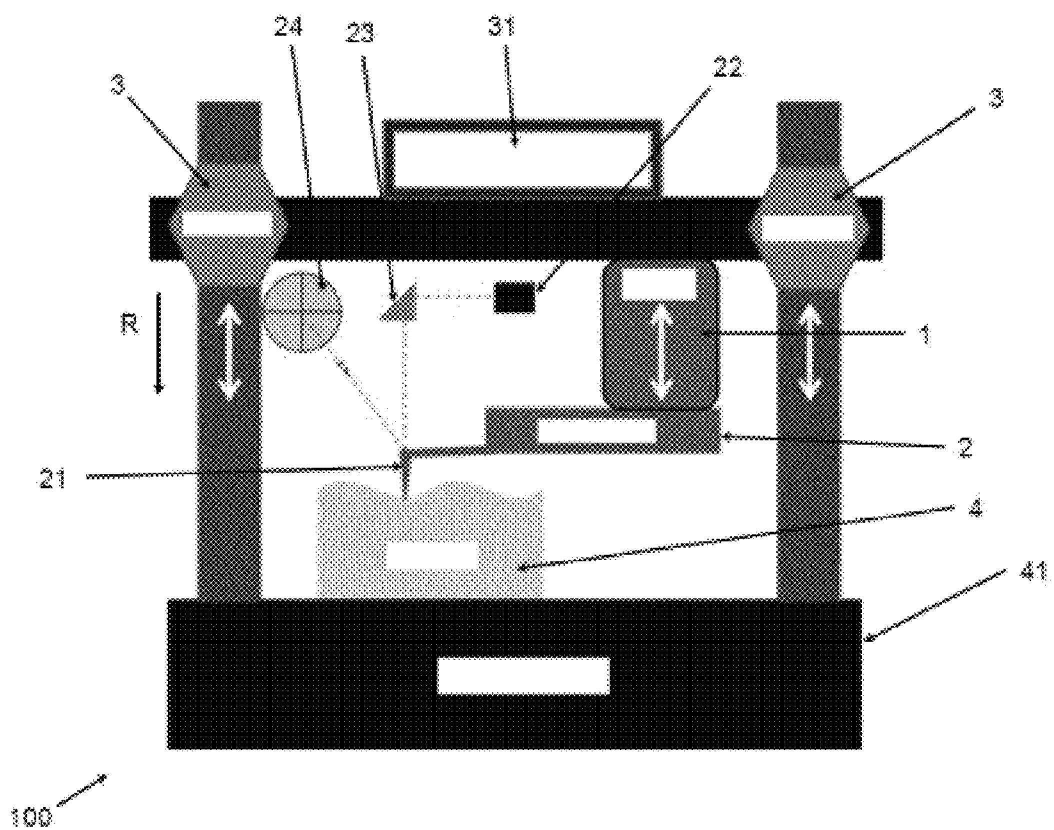
FIG. 1 shows a scheme of an embodiment of the invention with an AFM TOP-DOWN setup and with a vertical alignment component.

FIG. 1 shows the scheme of an embodiment of the invention in the TOP-DOWN setup, wherein the piezo element 1 is directly coupled to the cantilever 2. In case of the piezo element 1 is maximally extended along the first direction R and the contact between cantilever tip 21 and sample 4 surface is loose, the controller 31 starts the external motors 3 (actuator) to lower the cantilever tip 21 along the first direction R into the surface until desired extension of the piezo element 1 is reached. In case of the piezo element 1 is maximally retracted and the cantilever tip 21 is indented into the sample surface 4 with an undesired force, the controller 31 starts the external motors 3 to lift the cantilever 2 along the first direction R to restore a desired extension of the piezo element 1.

Example 2

Figure 2:
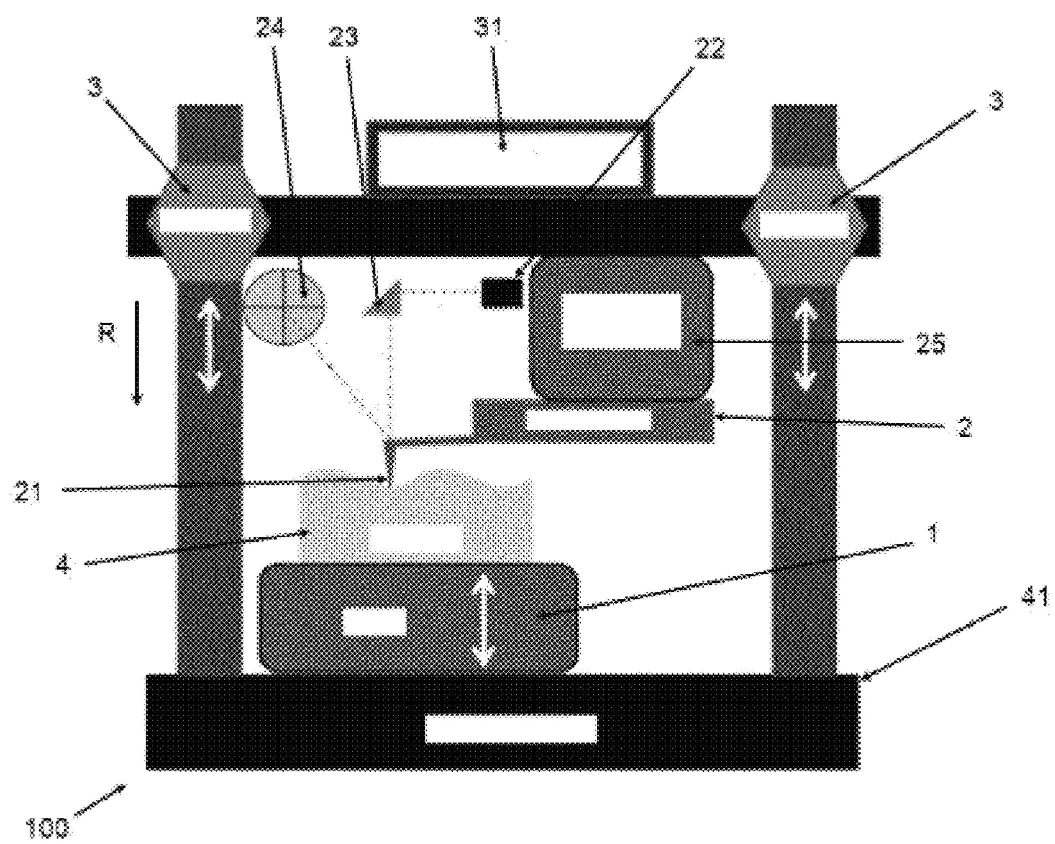
FIG. 2 shows a scheme of another embodiment of the invention with an AFM BOTTOM-UP setup and with a vertical alignment component.

FIG. 2 shows the scheme of another embodiment of the invention in the BOTTOM-UP setup, wherein the piezo element is directly coupled to the sample holder 41 and the cantilever 2 is attached to a cantilever holder 25.

Example 3

Figure 3:
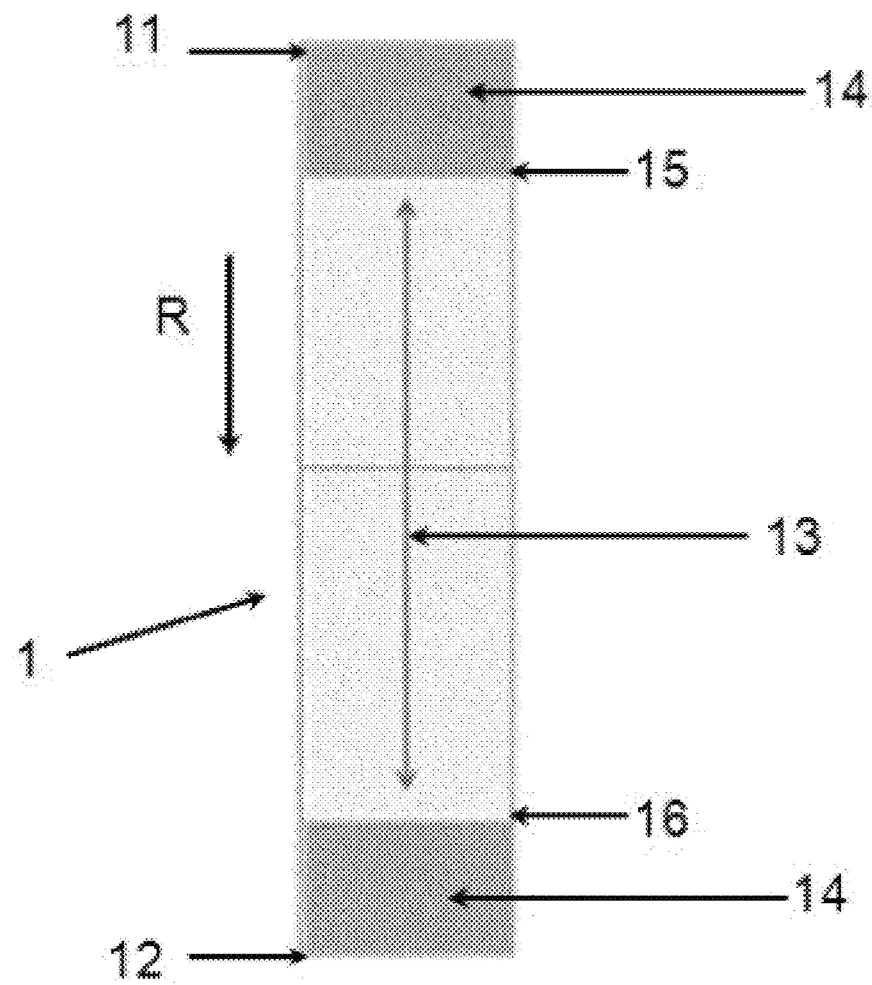
FIG. 3 shows a scheme of the piezo vertical movement.

FIG. 3 shows the scheme of the vertical piezo movement along the first direction R. The piezo element 1 is characterized by a maximal extension 12 and a maximal retraction 11. Between these to states there is the working range of the piezo element that can be divided into the optimal working range 13 and the non-optimal working range 14. A first threshold 15 is situated at the border between the optimal working range 13 and the non-optimal working range 14 on the side of maximally retraction 11. A second threshold 16 is situated at the border between the optimal working range 13 and the non-optimal working range 14 on the side of maximally extension 12.

When the sample is getting too high and the piezo element 1 is retracted to the threshold 15, e.g. less than 20% of or 2 μm from its full extension range, the controller 31 will activate the motors. The motors will move upwards and restore optimal working distance 13 of the piezo (e.g. between 20% and 80% of the maximum extension 12 or between the initial 2 μm and the last 2 μm of the maximal extension 12) (FIG. 3). If the piezo is extended more than 80% or the last 2 μm of the full extension range at threshold 16, the controller 31 will again start the motors 3, but this time they will move downwards to restore optimal piezo working distance 13 (FIG. 3). Typically, the cantilever 2 is lowered or lifted by e.g. 3 μm if one is working with a piezo element 1 of 15 μm full extension range. This value can be adjusted by the user to the given combination of AFM and motors 3.

Example 4

FIG. 4 a scheme of the an embodiment of the invention, wherein this embodiment related to the angle adjustment of the angle α between the moving direction R2 of the cantilever 2, in particular the tip 21 of the cantilever 2, and the surface of the sample 4 to be measured.

Figure 5:
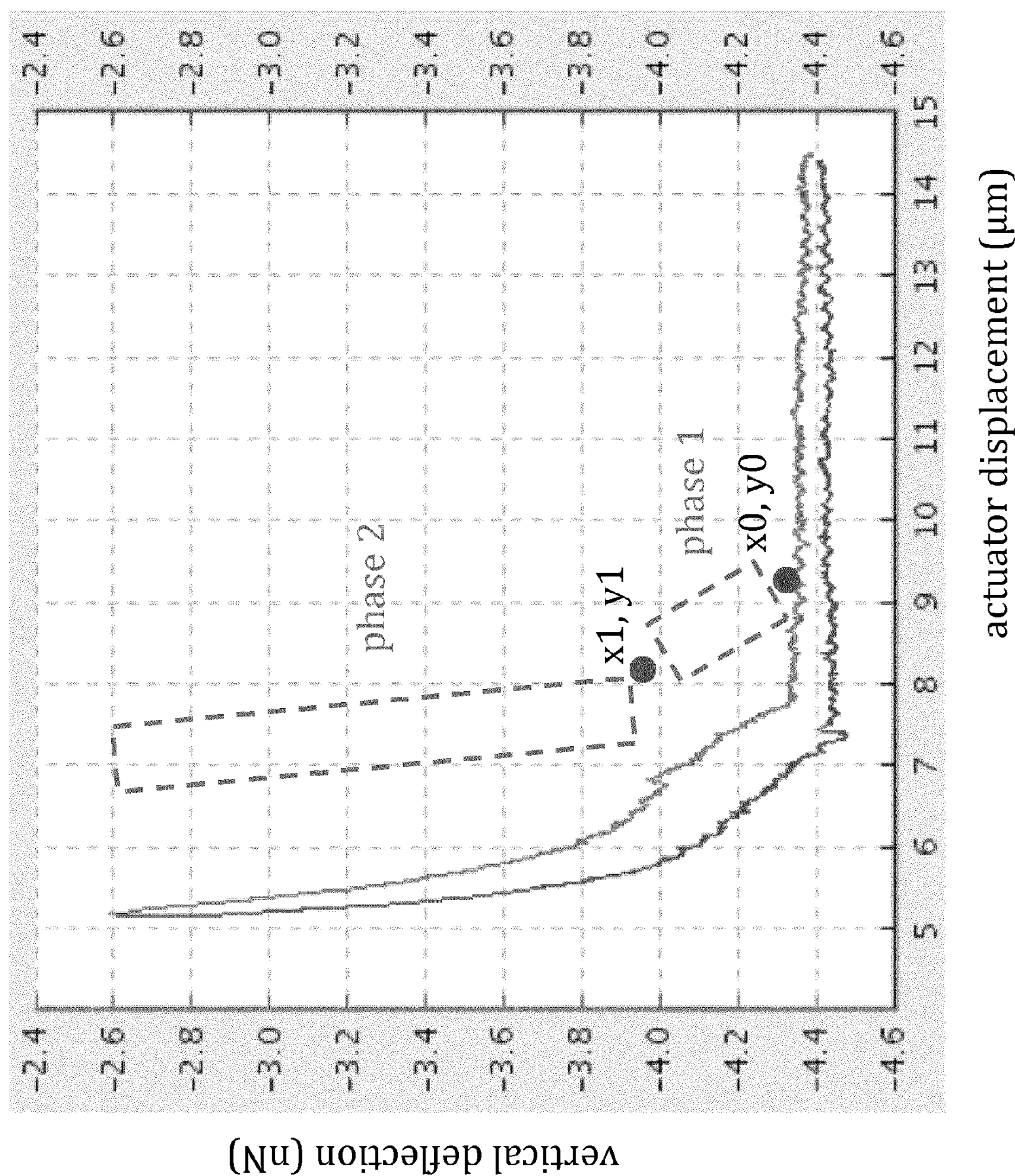
FIG. 5 shows a force-distance curve of an AFM measurement with a non-optimal (undesired) angle; the X-axis is showing the distance (height) and the Y-axis the force; light grey line—loading (trace) curve; dark grey line—unloading (retrace) curve.

FIG. 4 A shows a situation, wherein the cantilever 2 is not perpendicularly orientated to the surface of the sample 4 leading to a non-optimal approach of the cantilever 2 towards the sample 4 and inaccurate results of the AFM-measurement. The tip 21 of the cantilever 2 contacts the sample at point 53, which is the intersection between the axis 51 being parallel to the moving direction R2 of the cantilever 2 and the axis 52 being parallel to the normal N, which is a vector or a line perpendicular to the surface of the sample 4 at this point 53. A desired angle α is zero meaning that the moving direction R2 of the probe 2 is parallel to the normal N, or axis 51 is parallel to axis 52. The result of an AFM measurement with such non-optimal, undesired angle is shown in FIG. 5.

Figure 6:
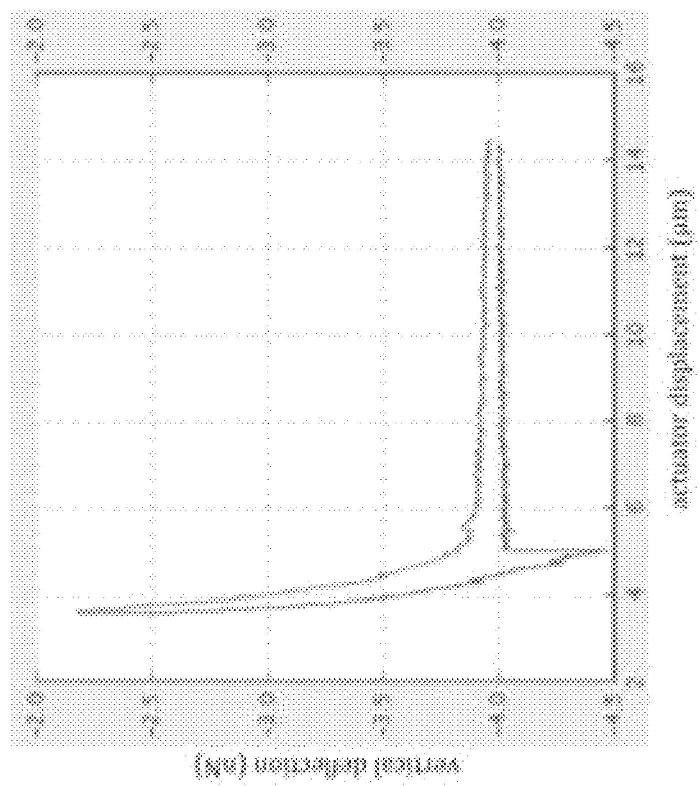
FIG. 6 shows a force-distance curve of an AFM measurement with a corrected, optimal (desired) angle; the X-axis is showing the distance (height) and the Y-axis the force; light grey line—loading (trace) curve; dark grey line—unloading (retrace) curve.
Figure 7A:
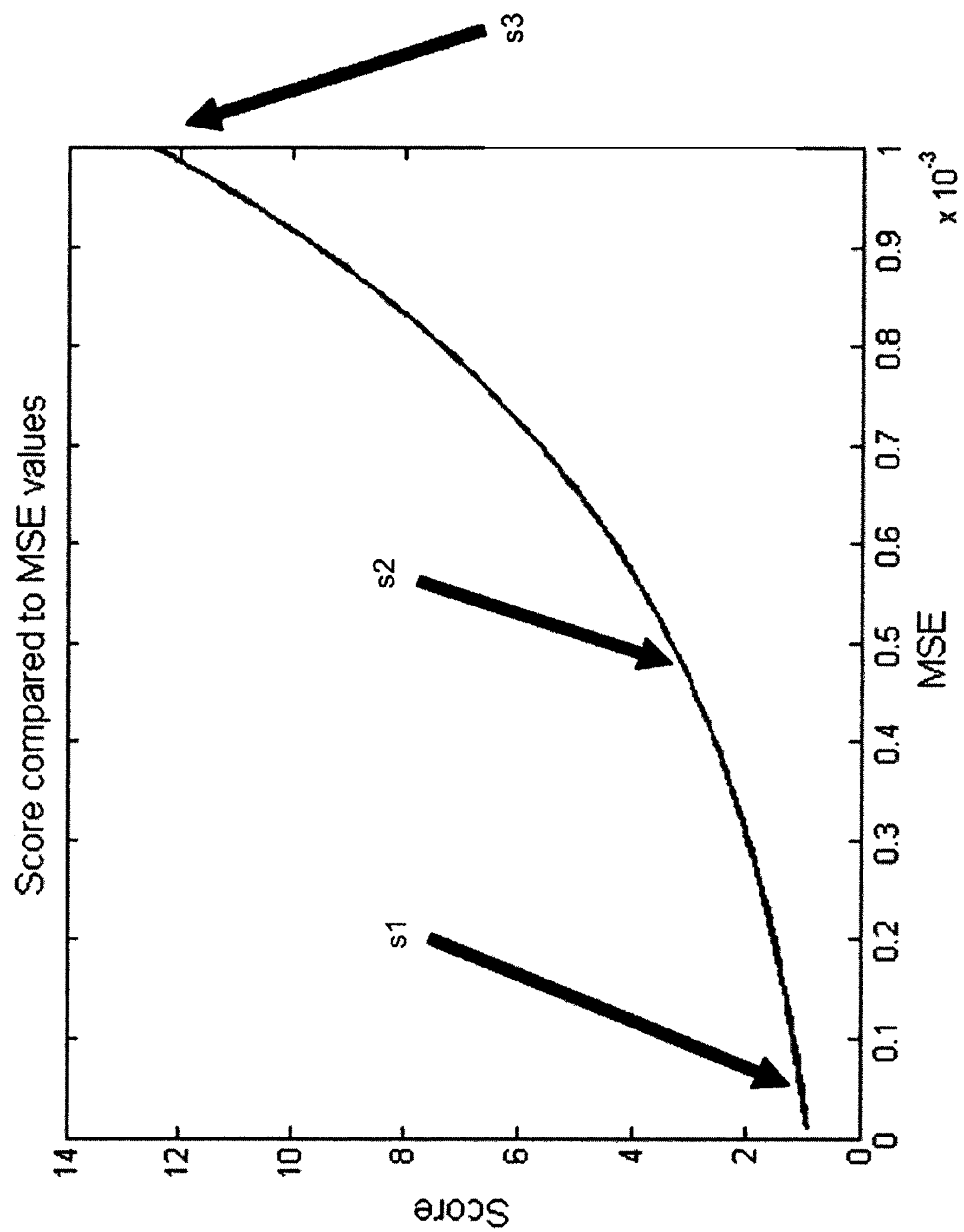
FIG. 7 shows the MSE (mean squared error between the linear fit and the raw data) impact of on the straight baseline score.
Figure 7B:
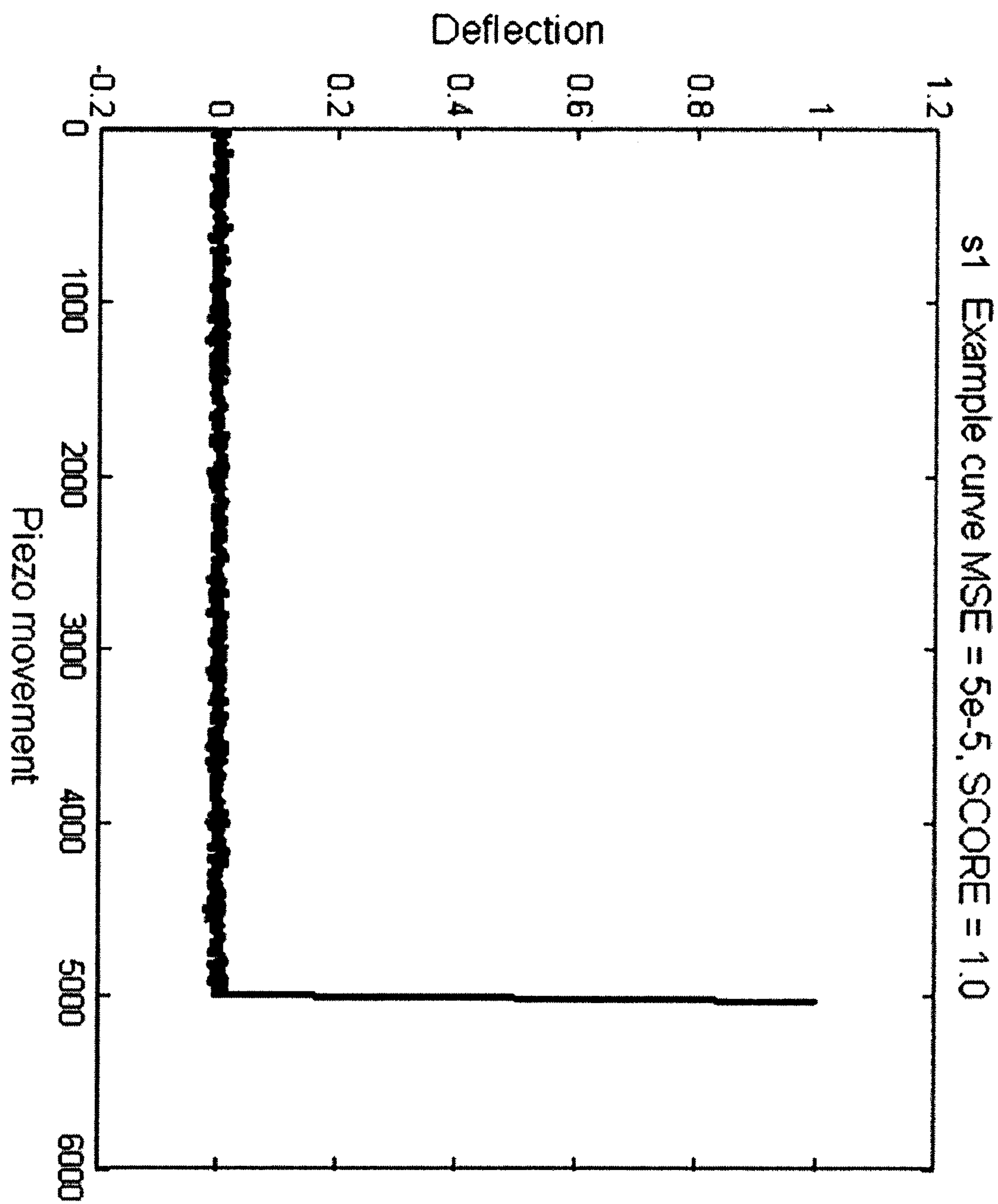
Figure 7C:
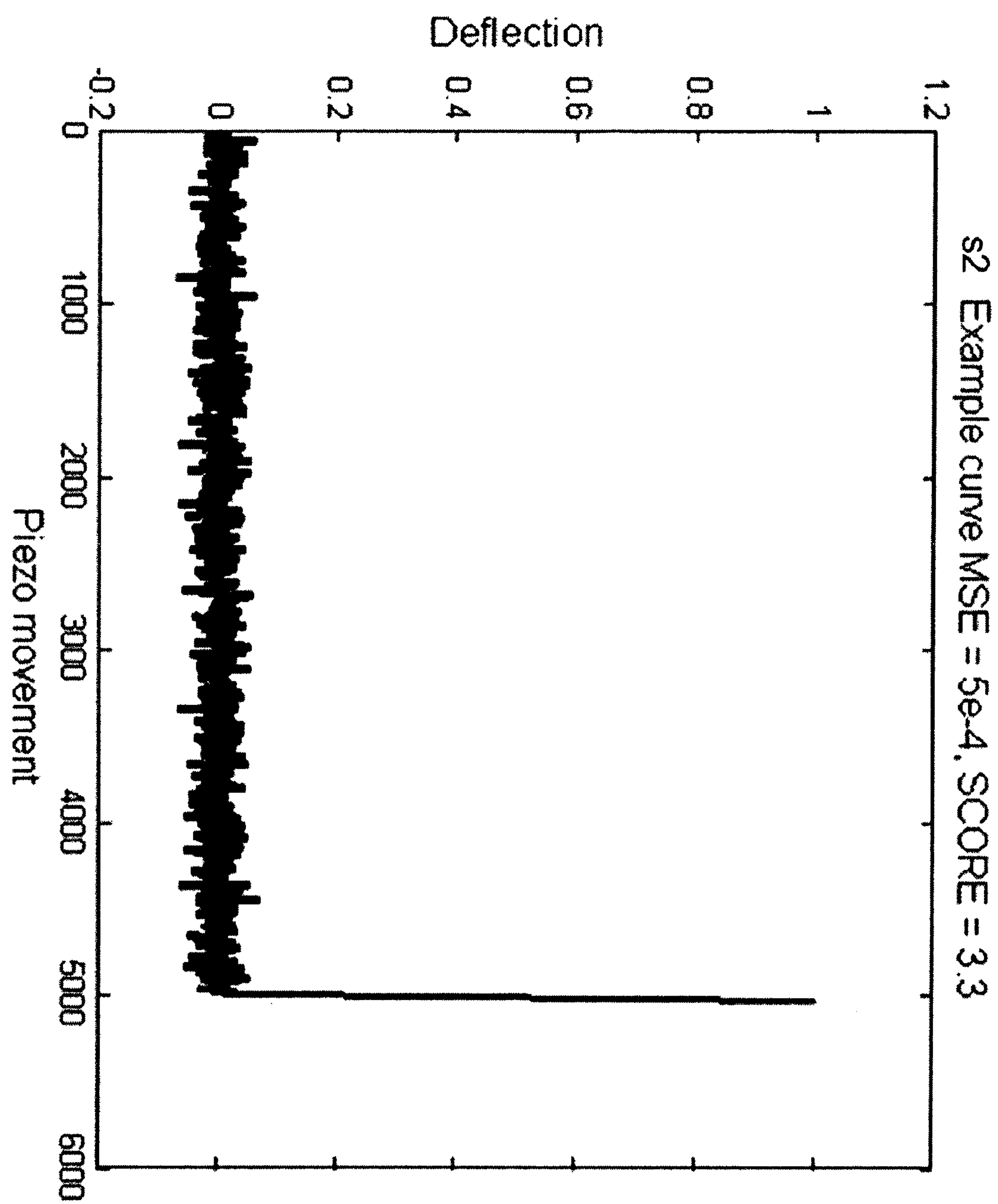
Figure 7D:
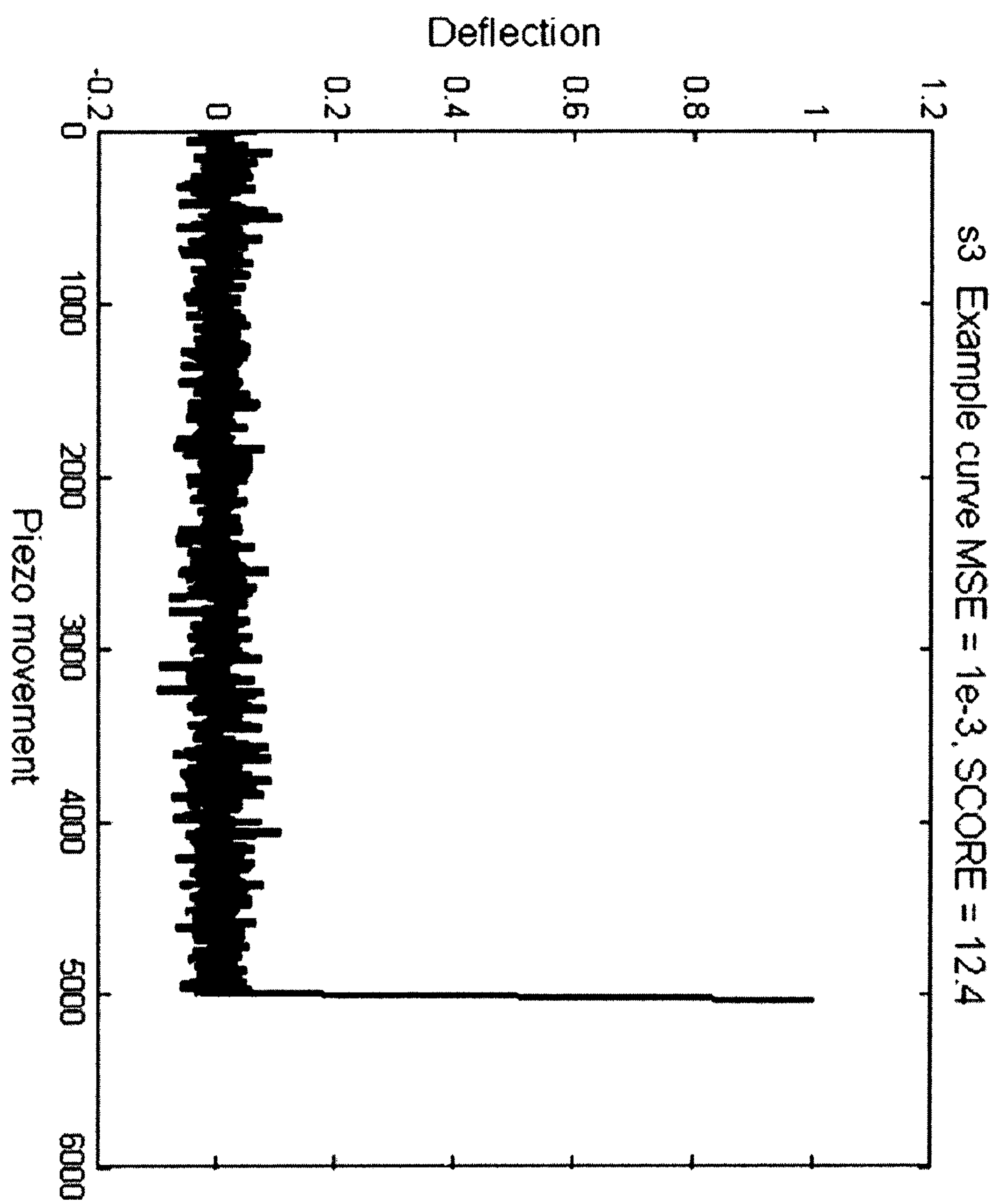
Figure 8A:
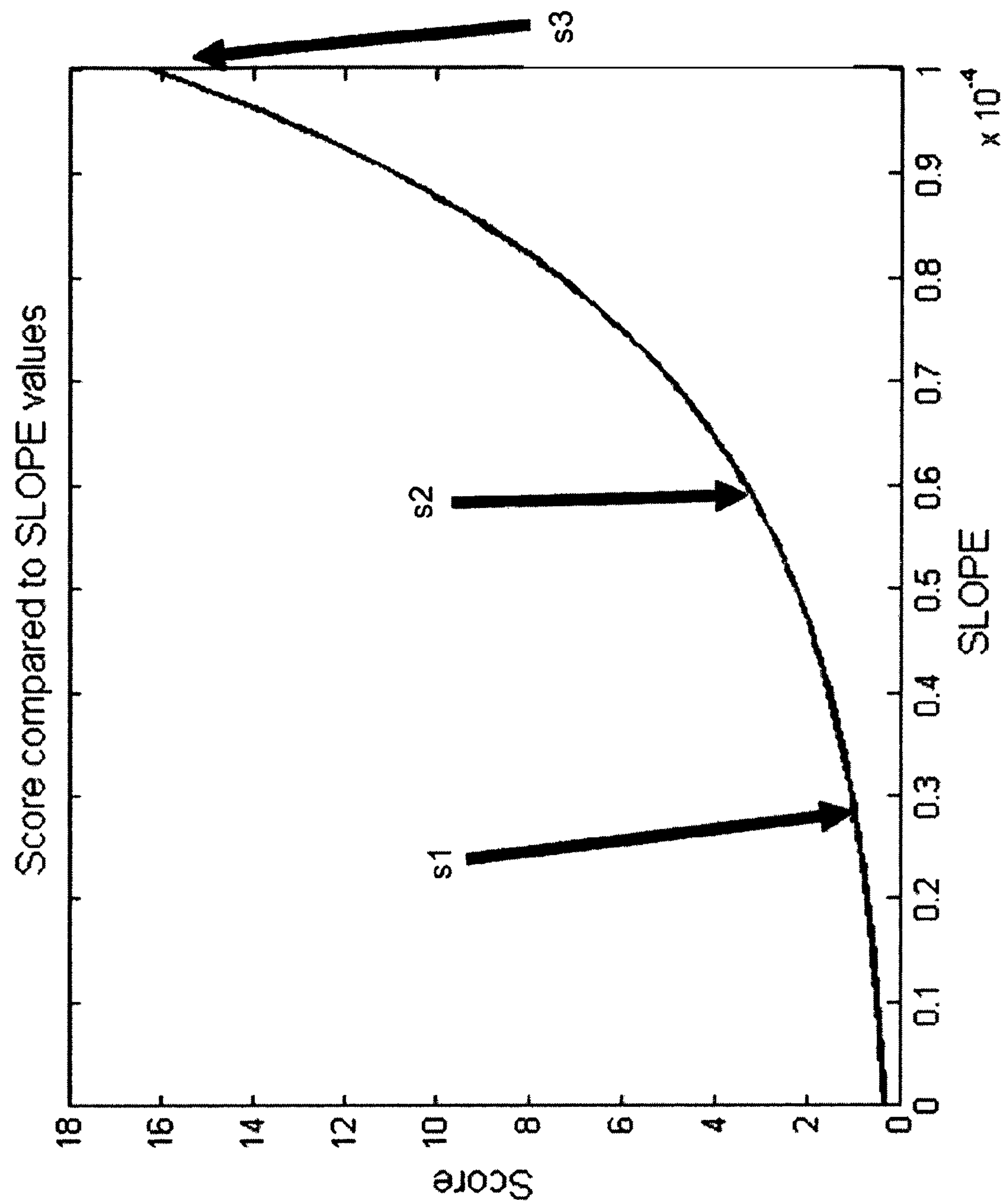
FIG. 8 shows the impact of the slope on the low noise baseline score.
Figure 8B:
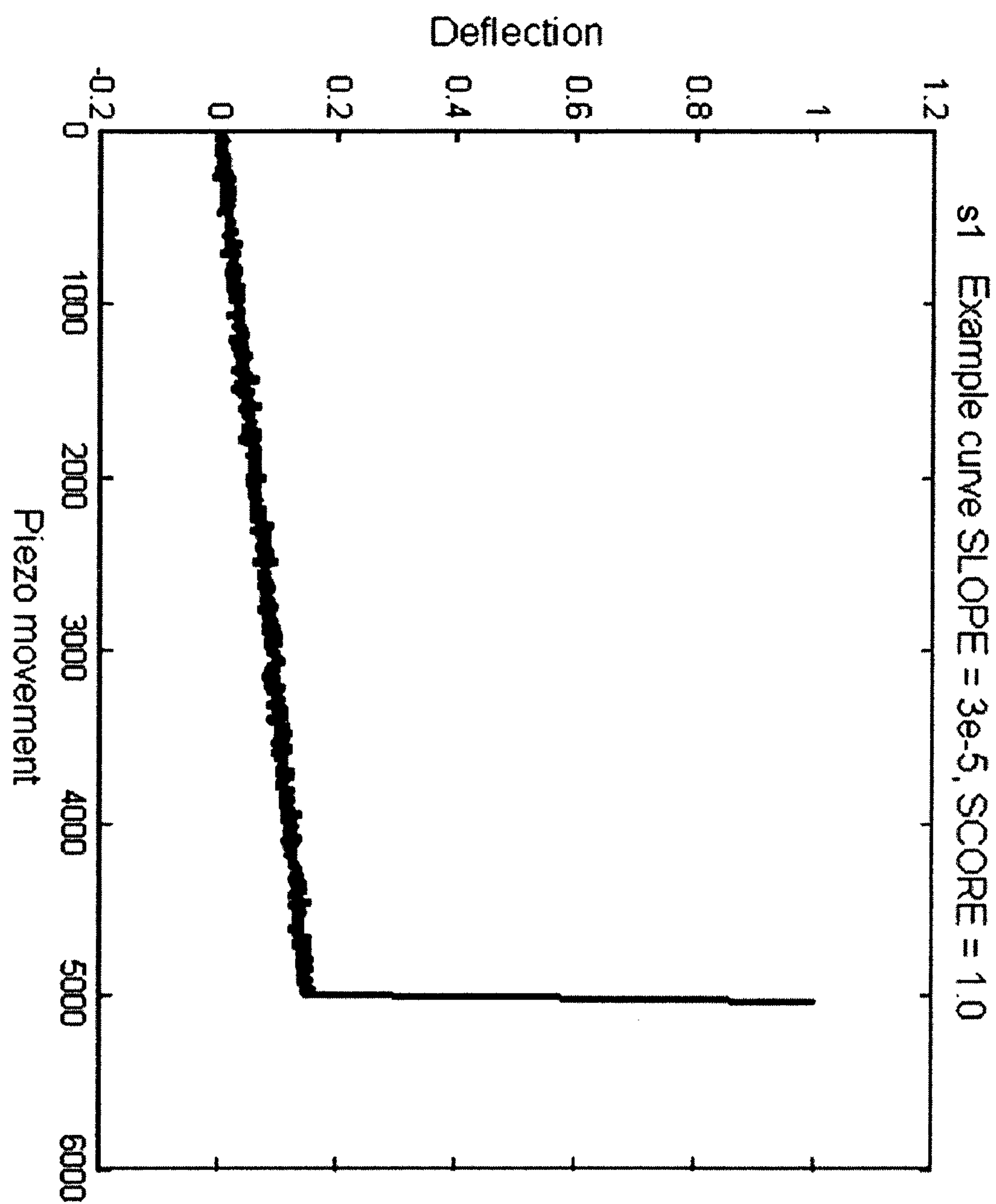
Figure 8C:
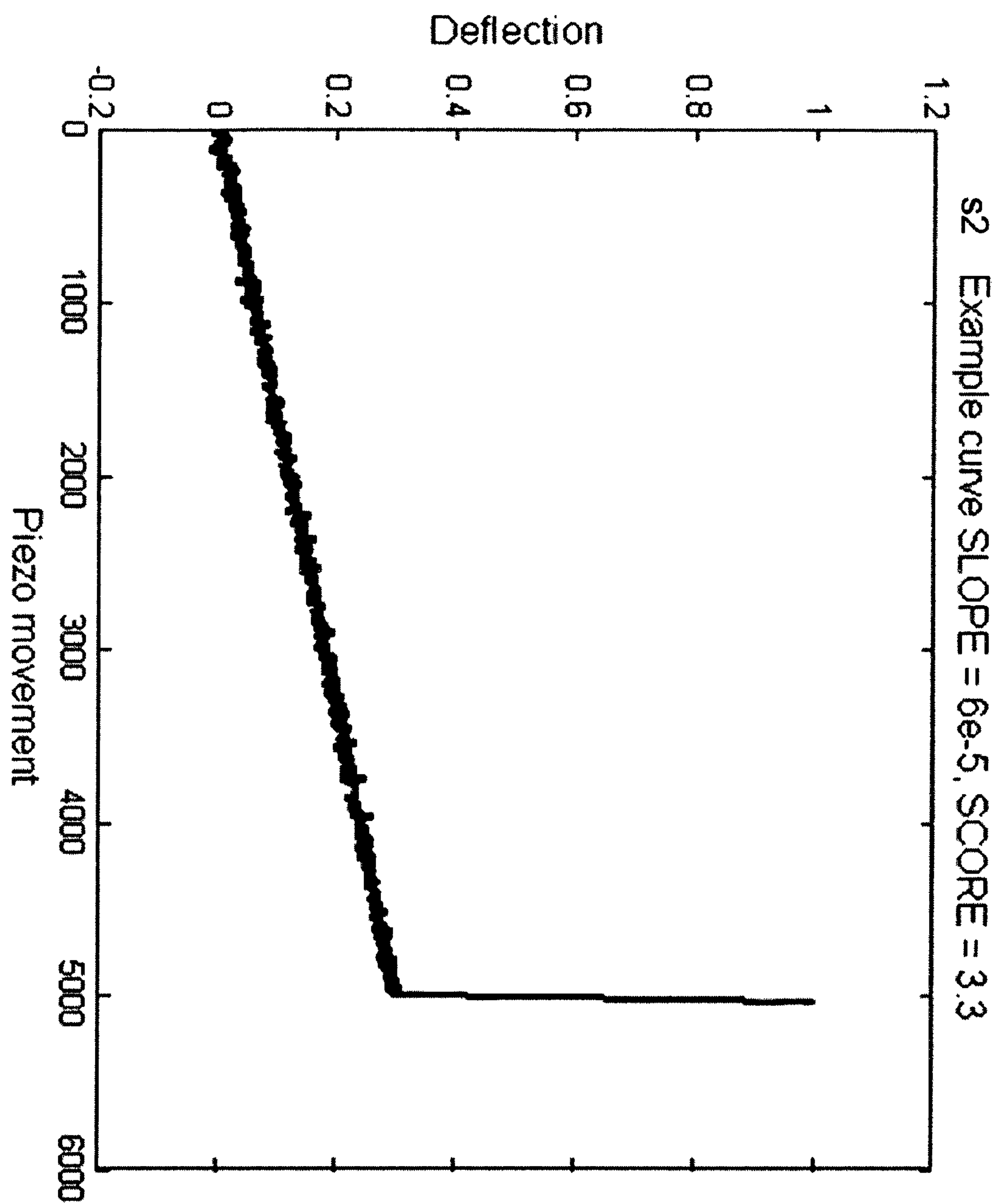
Figure 8D:
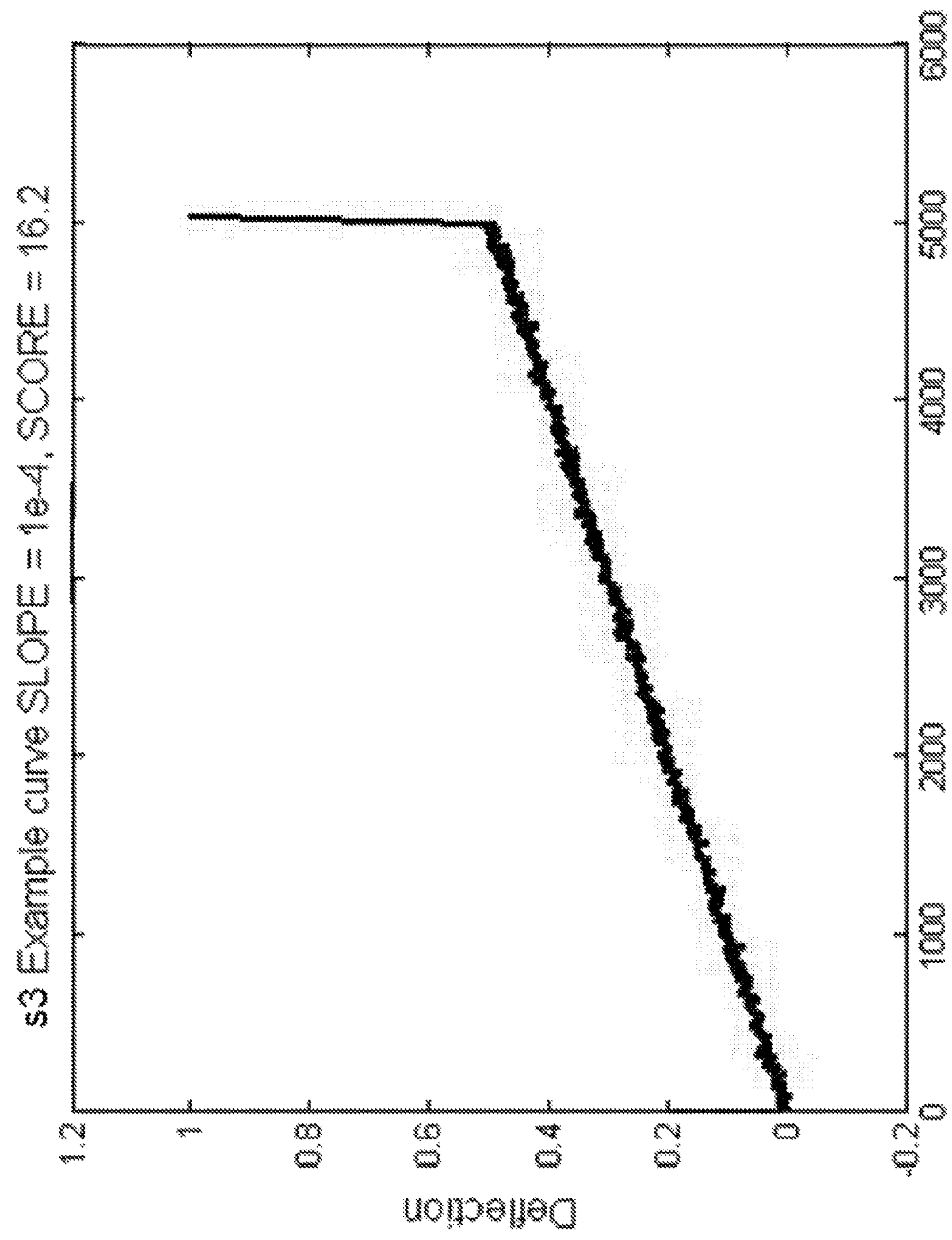

This adjustment of the angle α can be achieved by help a first actuator 3 and a second actuator 32, and optionally a third actuator 33 (FIG. 4 B), wherein the sample 4 is tilted together with the nanoscanner 1 by the retraction of the first actuator 3 and expansion of the second actuator 32, and optionally by expansion or retraction of the third actuator 33. In this case, the normal N approaches the moving direction R2 of the probe 2, until moving direction R2 and the normal N are essentially parallel. The extension or retraction of the first actuator 3, the second actuator 32 and the third actuator 33 as well as the monitoring of the angle α are operated by an actuator control unit 34. The result of an AFM measurement with such corrected, optimal, desired angle is shown in FIG. 6.

Alternatively, also the probe 2 may be tilted by a first actuator 3 and a second actuator 32 attached to the probe 2 such that the moving direction R2 of the probe 2 approaches the normal N, until the moving direction R2 and the normal N are essentially parallel.

The angle α can be monitored by measuring signal from the photo-diode 24, whereby a laser is focused on the cantilever back, and reflected onto the split photodiode 24, where both the vertical and the lateral deflections of the cantilever 2 are monitored. A substantial lateral deflection of the cantilever can be observed by a shift of the reflected laser beam on the photodiode 24. Therefore, if the lateral deflection of the cantilever 2 is substantial during vertical approach along the moving direction R2 the angle α needs to be adjusted. In addition, depending on the shape of recorded vertical indentation force curve it is possible to detect if the angle α is optimal or not.

Example 5

Baseline Detection

1) Score of Straight Base Lines

Since the deflection values depend on various system parameters such as spring constant, deflection sensitivity or tissue stiffness, it is important to rescale the whole deflection curve by dividing it by its maximum value. The noise of this new curve can be best understood by signal-to-noise means.

Artificial, straight baselines are generated with a given slope and an overlaid white Gaussian noise in MATLAB. This allows to express curve quality concerns in actual numbers by defining a threshold for both noise and slope above which the curve is declared non-perfect. It is determined by expertise that curves with MSE values of MSE0=5e−5 and a slope of SLOPE0=3e−5 are just barely achieving this perfect score (in other words those two values form the threshold).

An exponential scoring system is proposed such that values below given threshold values achieve a score of 1 and less, and values above it result in an exponentially growing score value. For MSE, it is determined that a 10-fold increase in MSE results in a 3.3 increase in score. For slope it is defined that a doubling results in a 3.3 increase in score.

$$SCORE_{MSE}=\exp(k_{MSE}*(MSE-MSE_0))$$

$$SCORE_{Slope}=\exp*(k_{slope}*(SLOPE-SLOPE_0))$$

From the premises it follows that $k_{MSE}$=2653 and $k_{slope}$=39800. FIGS. 2 and 3 gives more insight in how the baselines are graded.

The overall score is a combination of both individual scores given by $$SCORE=A*SCORE_{MSE}+(1-A)*SCORE_{Slope}$$

Figure 9A:
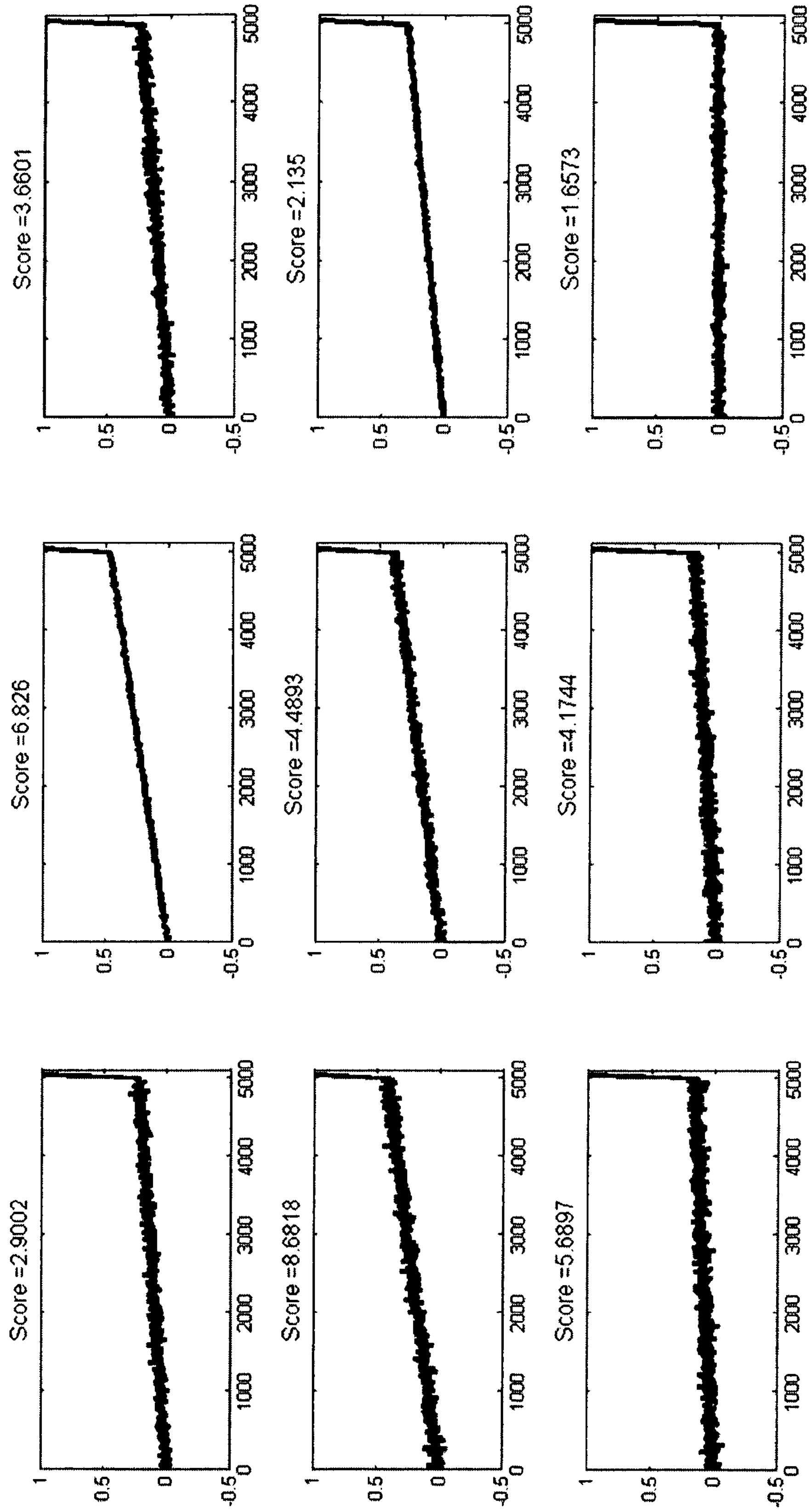
FIG. 9 shows the scores for straight baselines with random noise and slope.
Figure 9B:
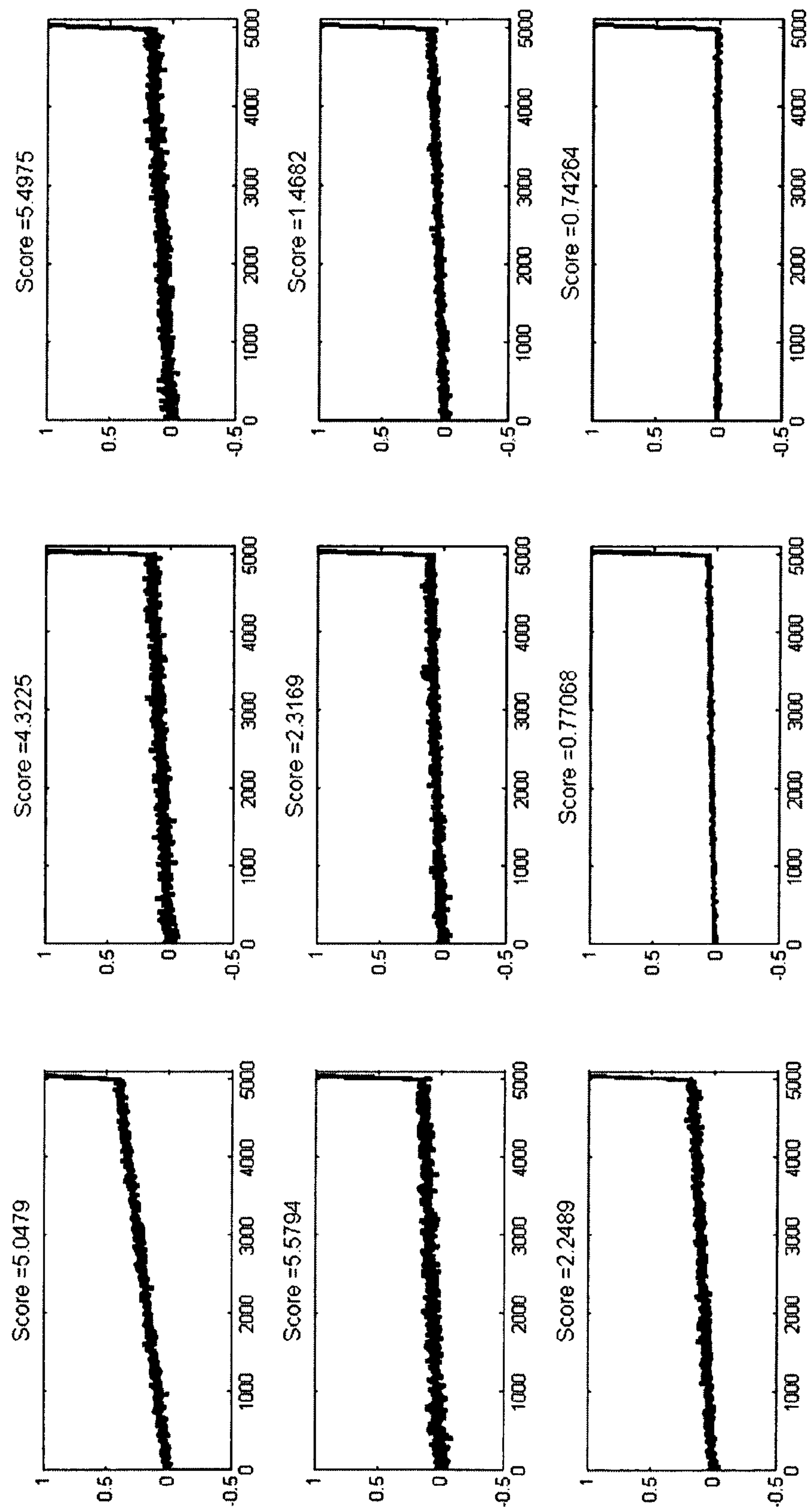
Figure 9C:
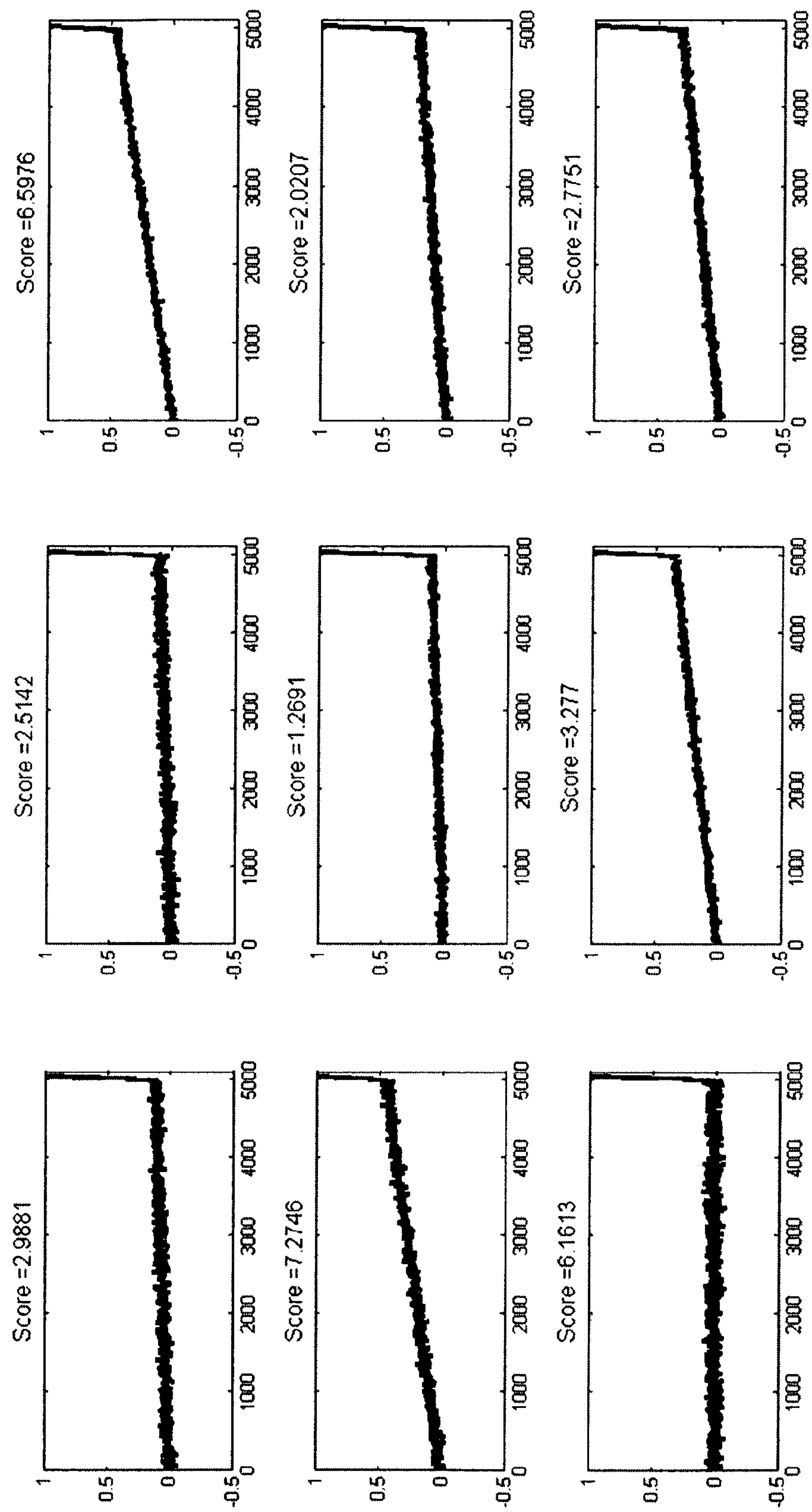

Some curves and their score can be seen on FIG. 9 for A=0.5.

2) Score of Non-Straight Base Lines

The method described in 1) is used to score non-straight, real baselines. The baseline can either be fitted in its entirety with a straight line (resulting in overall score) or it can be segmented in any number of segments n (resulting in n subscores). Those subscores can be cast into an overall score by e.g. taking the mean.

Figure 10:
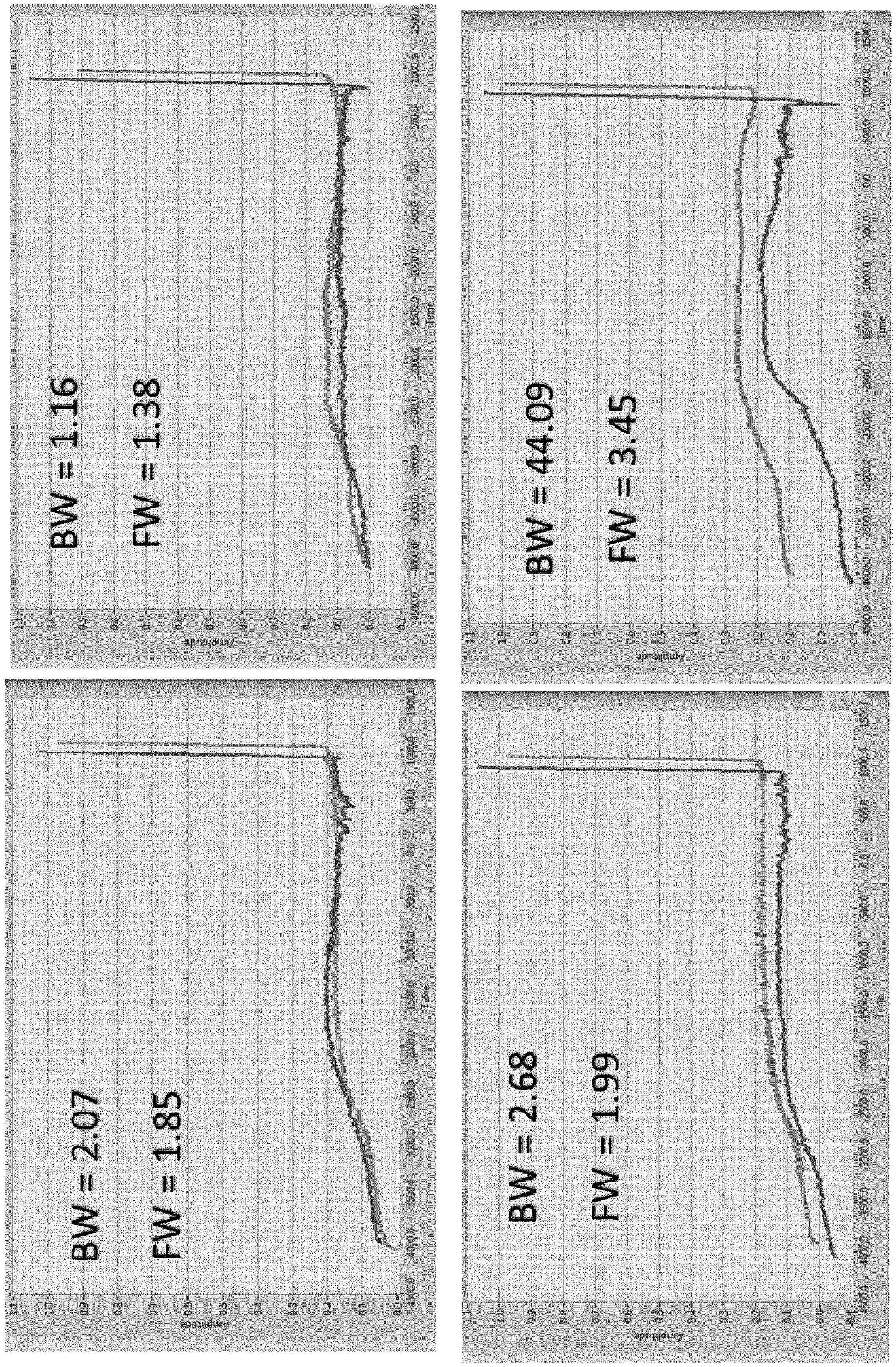
FIG. 10 shows the scores for real force curves.

In the presented concept, a computational intensive approach is taken. A segment size is defined as a percentage of the whole data set. For every single data point, a number of points corresponding to the segment size are appended. Every segment is then analysed as if it was a straight line as prescribed above. The overall score is then taken as the mean of all segments scores. FIG. 10 shows how the scoring system scores measured curves individually for approaching and retracting part. A score above 1 leads to discarding the curve.

Particularly, the baseline scoring comprises the steps of:

1. Force curves are shifted on y-axis by setting their maxvalue to the setpoint
2. In order to retain only noncontact area, the shifted force curve is truncated at a percentage of the setpoint (denotated deflection truncation) [e.g. at 10%]
3. Additionally from the retained data, a percentage [e.g. 10%] of the full set is cut at the end, to remove the low-deflection contact part and only retain non-contact area (denotated piezo truncation). The now retained data set is assumed to be non-contact area.
4. The remained data set can now either be analysed with fixed length segments or with variable length segments.
5. For segments of fixed length [e.g. 20% of the retained data set], every point of the assumed non-contact area is attached a segment with the given number of points, which is analysed as described in baseline-scoring. The overall score is the score of all segments, and the best segment is the one with the lowest score.
6. For variable segment length, a start segment length is defined [e.g. 0.1] as well as a segment multiplier [e.g. 2] and a maximum segment length [e.g. 0.6]. Step 5 is initiated for the start segment length and repeated for NewSegment=OldSegment*SegmentMultiplier until the maximum segment length is smaller than the new segment length. Of all segments, the lowest score defines the best segment. Because bigger segments are prone to have a higher MSE, the score of bigger segments is multiplied with a factor k<1, where k can be calculated such that a segment length doubling allows a 20% higher MSE. The overall score is the mean from all segments with best segment length.
7. Values on the left-hand side of the best segment are truncated. The best segment is undertaken a linear fit. The resulting intercept is subtracted from the data set, so that the baseline lies on zero deflection. The slope can be removed from the whole data set (tilt correction) if wished.

Example 6

Contact Point Detection by Reconstructing Adhesive Part

Figure 11:
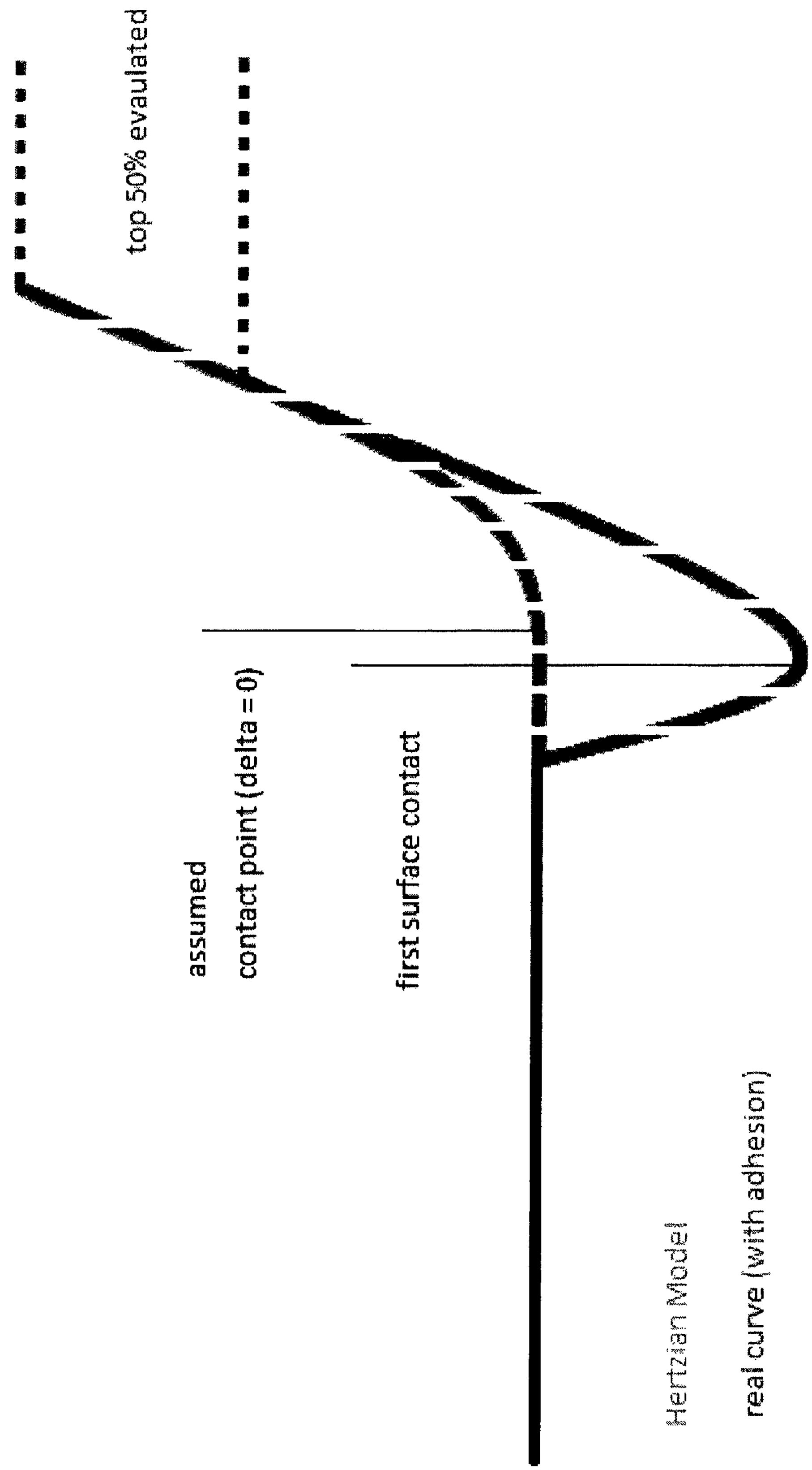
FIG. 11 shows a schema of the general concept for the contact point detection, solid line-noncontact area baseline; long dashed line-contact area with some attractive forces; dotted line-used contact area; and short dashed line-reconstructed curve without attractive forces.

The general idea is to ignore adhesive and saw tooth disturbed parts and reconstruct the curve by using both the base line deflection and some points of the contact area with a significant indentation, far away from initial contact. By using a power law of either physical background (e.g. Hertzian Indentation) or with empirical coefficients, the contact area is approximated and reconstructed. FIG. 11 shows the general concept.

Indentation as described by Hertz has the following correlation between force and indentation $$F=\lambda*\delta^2$$

Using the condition that the baseline is 0 and has a slope of 0 (it was corrected in a first step), it can be reformulated, so that deflection d and piezo movement w can be used as $$d=b*(w-w_0)^2$$

Here b is a scalar and $w_0$ is the contact point. The main interest in the beginning of the analysis lies in the question whether Hertzian indentation is applicable. In our case, where we use a sharp tip, in most of the cases the tip movement is not perfectly perpendicular to the surface and instead angular. This could have an impact on the power factor. In order to analyse the situation more general, a more general approach is used $$d=b*(w-w_0)^\alpha$$

To follow this approach an algorithm performs a power law fit with fixed alpha (but not necessarily 2) and is hence a 2 parameter fit (b, $w_0$). In both cases, the contact point is not an input but a fitting parameter and hence a calculation of it is possible without using actual data including it.

The resulting alpha equals the best power function to describe the movement and can be compared to the proposed value of 2 (from Hertz) or previously published empirical values. Further goal is to develop an empirical guideline on what alpha to use, as alpha might be a material parameter or show dependencies to tissue stiffness.

The algorithm makes it possible to analyse very difficult curves, where contact point lies in adhesive or saw-tooth region and is very robust.

Particularly, the detection of the contact point comprises the steps of:

1. The baseline is analysed and truncated by other means (e.g. baseline scoring) and the whole data set is shifted, such that the baseline lies on zero deflection
2. A percentage of the max deflection value (e.g. 50%) and points with higher deflection are used as the data set to reconstruct the whole curve.
3. With a given alpha value, the retained data is fit with a power law function. This results in the reconstructed curve (model fit, see detailed description). The alpha can be either set to 1.5 or 2 (as proposed by Hertz) or seen as a material parameter (empiric tables).
4. From the model fit, the E-modulus, indentation and slope at max deflection can be calculated.

Example 7

The Cantilever is Indenting Sample with Parts Other than Tip

Figure 15:
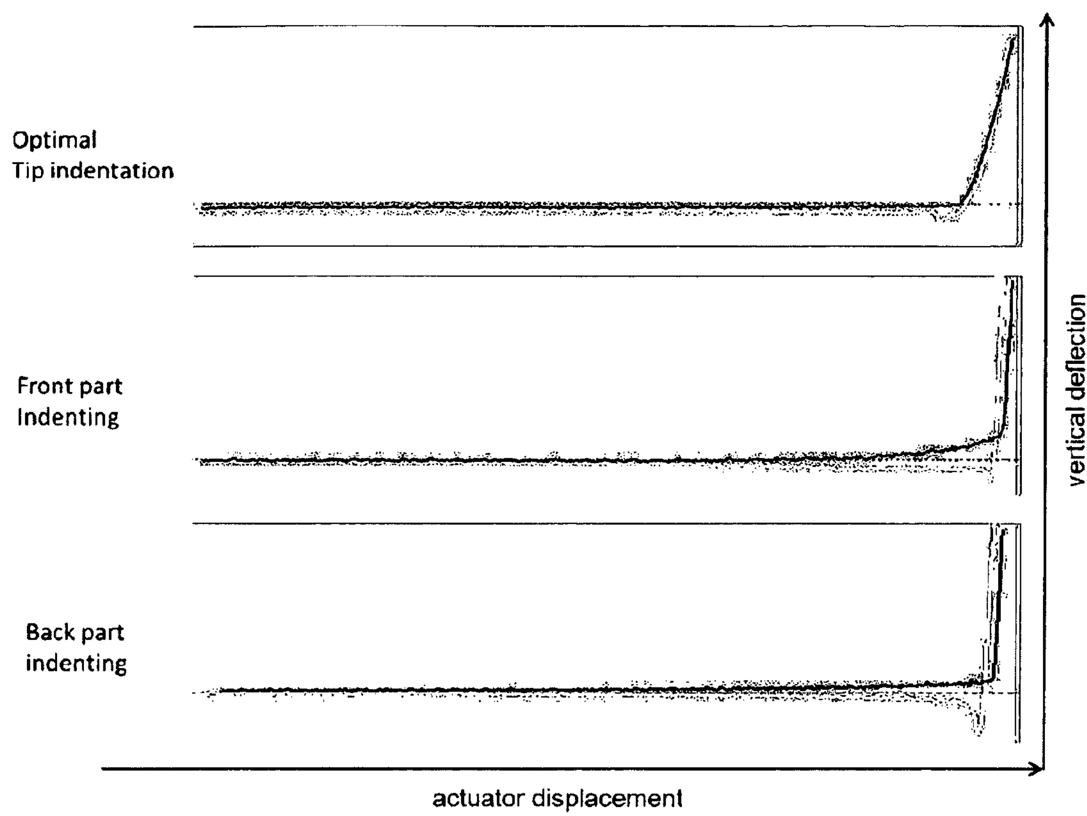
FIG. 15 shows exemplary force curves with optimal tip indenting (upper panel), front part indenting (middle panel), and back part indenting (lower panel), black line approaching curve, white line retraction curve.
Figure 17:
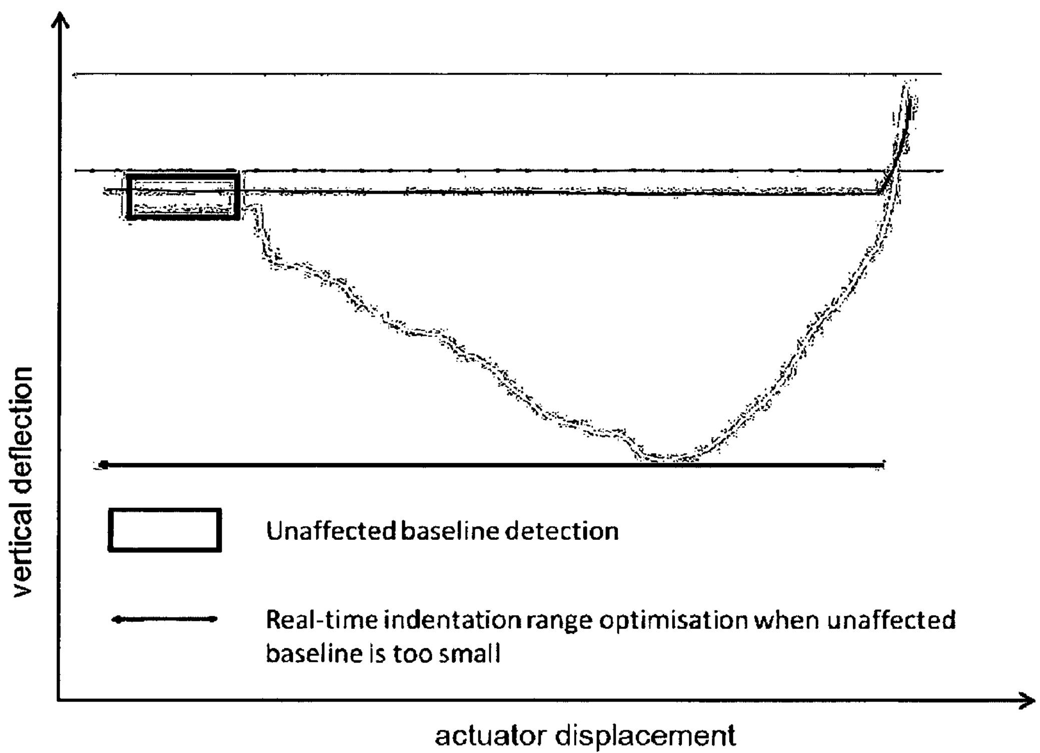
FIG. 17 shows a scheme of baseline detection and real-time indentation cycle optimisation.
Figure 18:
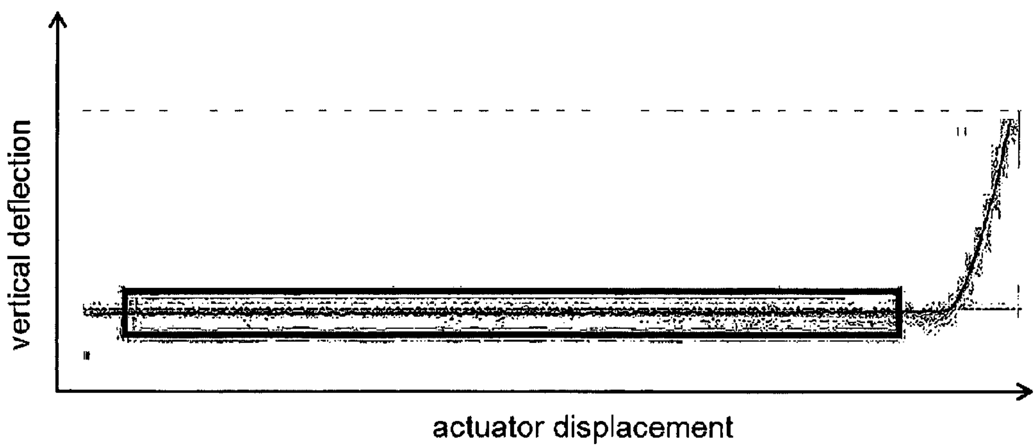
FIG. 18 shows an exemplary force curve, wherein the unaffected part of the baseline is framed.

Force curves recorded during the indentation of the sample with different parts of the cantilever could substantially biased the final results as shown in FIG. 15 (middle panel, lower panel). Approaching and retraction curves show opposite and increasing deflection values far beyond the actual contact area. This is detected by combining the following approaches:

a. The contact point calculated from the force reconstruction approach is compared to the first point with deflection below zero (search from right hand side). In a non-disturbed curve set, this two points should be in proximity.
b. Approaching and retraction curve both show a slow increase in deflection (perturbed by the cantilever contact) resulting in a contact area larger than usual and the resulting deflection deviations are of opposite directions. This is recognized by comparing of approaching curve to the negative part of retraction curve.

c. The area between approaching and retraction curve is greater than measured in the unaffected part of baseline (FIG. 13, framed area), wherein particularly the optimal baseline part might be a fraction (the best part) of the unaffected baseline.
d. Since there is a transition between cantilever contact (slow increase in deflection) and actual tip contact (unperturbed force curve with steeper increase), the first derivative and the second derivative of the curves show discontinuities.

There is no existing solution in the AFM field which could detect and overcome this issue. Therefore, large amount of data recorded with standard AFMs are biased due to the present issue.

Based on the absolute signals of the vertical and lateral movement of the cantilever (photodiode detection), it is not possible to distinguish which part of the cantilever is indenting sample. Moreover, during visual inspection of the force curve very often it is not obvious that indentation is not done by the tip exclusively and optimally.

Therefore, an algorithm is provided, which detects if cantilever is optimally indenting the sample. In particular, the algorithm can detect if indentation cycle is done with the following steps:

1. Detection of the optimal baseline part of the force curve (see above);
2. Detection of the contact point of the force curve (see above);
3. If a splitting is present in the baseline segment of the contact point proximity an indentation with a cantilever part other than tip is detected. If approaching force curve within the splitting segment is within linear behaviour, a cantilever back part indentation is present. If approaching force curve within the splitting segment is out of linear behaviour, then cantilever front part indentation is present.
4. If indentation with the front part of cantilever is detected, the cantilever is withdrawn and moved forward along the cantilever axis (which is parallel to the sample surface), where the indentation cycle is performed. This step is repeated until force curves don't exhibit specific features of indentation with the front part of cantilever.
5. If indentation with the back part of cantilever is detected, the cantilever is withdrawn and moved backward along the cantilever axis, where the indentation cycle is performed. This step is repeated until force curves don't exhibit specific features of indentation with the back part of cantilever.

An example for a force curve characterized by an optimal indenting is shown in FIG. 15, upper panel, wherein both approaching and retracting part of the curves are parallel along the whole axis. An example a force curve characterized by a front part indenting is shown in FIG. 15, middle panel, wherein in the proximity of the contact point both approaching and retracting curves are separating e.g. splitting part; wherein the approaching part is becoming non-linear in the final part of splitting (right-hand side of the curve). An example for a force curve characterized by back part indenting is shown in FIG. 15, lower panel, wherein in the proximity of the contact point both approaching and retracting curves are separating e.g. splitting; retracting part is more non-linear in the final part of splitting (right-hand side of the curve) while approaching curve is much more linear along the whole axis.

Figure 14:
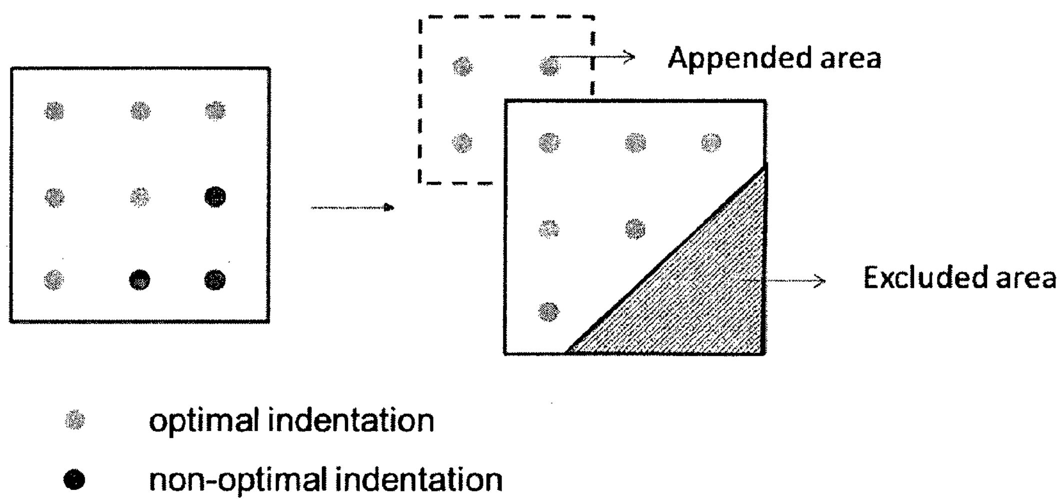
FIG. 14 shows a scheme of the evaluation of a measured 3×3 grid on a sample.

This algorithm can be used in the single indentation cycle event as described above but also as the part of optimization of indentation area protocol, where new area of interest within the sample is briefly tested for indentation testing suitability. Area of interest in initially tested within 3×3 or bigger indentation array uniformly distributed across the area using 1) and 2) algorithms for potential non-optimal indentation sub-segments. If part of the area is declared as non-optimal sub-segment, then the area is excluded from measurements and new sub-segments preferably in proximity of optimal indentation sub-segments are scanned for potential indentation in order to maintain contact overall indentation area per area of interest (FIG. 14).

Example 8

Tip is Approaching not Optimally to the Sample Surface

Indentation cycles which are not optimal are affecting final results. In the case of biological samples that are often rough, this is representing a substantial issue. FIG. 15 show examples of force curves with non-optimal tip approach.

Currently there is not system which can detect and correct the indentation cycle.

Based on the readings from photodiode and analysis for specific features in the approach and retracting force curve, an algorithm presented here is able by controlling hardware to correct and optimize indentation cycle.

Particularly, the algorithm comprising the steps of:

1. Detection of the optimal baseline part of the force curve (see above).
2. Detection of the contact point of the force curve (see above).
3. Force curve analysis. The force distance curve is segmented into segments starting from the contact point (FIG. 5. x0, y0) of the force curve such that a different amount of the curve is covered by each segment. These segments are fitted then using standard single material indentation theory. At a phase transition (FIG. 5. x1,y1) the RMSE increases as the single material is not valid anymore. Hence the start of a new phase is recognized by comparing RMSE of segments located between x0 to x1 and x1 to xn. For the second phase the same algorithm is applied using the transition point x1 (start of a new material) as a new contact point x1 and excluding the data between x0 and x1. This cycle is repeated until xn is reached. (FIG. 5).
4. Vertical and lateral signals from the photodiode are recorded.
5. If approach and/or retraction part of the force curve exhibit distinct two, three or more phases of deflection (e.g. blue colour approaching deflection segment exhibit two phases in force curve presented in FIG. 5), then a non-optimal tip indentation is declared, and based on the signal from lateral segment of photodiode angle is corrected, and adjustment step is repeated until characteristic feature is absent.

Example 9

Different Structures Across Sample Exhibit Different Indentation and Adhesion Properties, which Require Dynamic Piezo Range Adjustment in Order to Ensure Convenient Measurements (Fast and Accurate)

An indentation cycle should be long enough to enable tip at the end of the cycle to go out of the contact with the sample (e.g. retracting force curve should finish with the unaffected baseline part), otherwise the next indentation cycle is starting with the tip in contact with sample. FIG. 12 shows the baseline detection and the real-time indentation cycle optimisation.

Reproducible measurements require constant approach and retract velocity what in the case of large indentation range means increased time for each indentation cycle. Based on the standard biological sample measurement where more than 10 000 indentation cycles are performed, dynamic real-time indentation range adjustment is saving substantial time needed for the whole experiment while accuracy is maintained.

Figure 13:
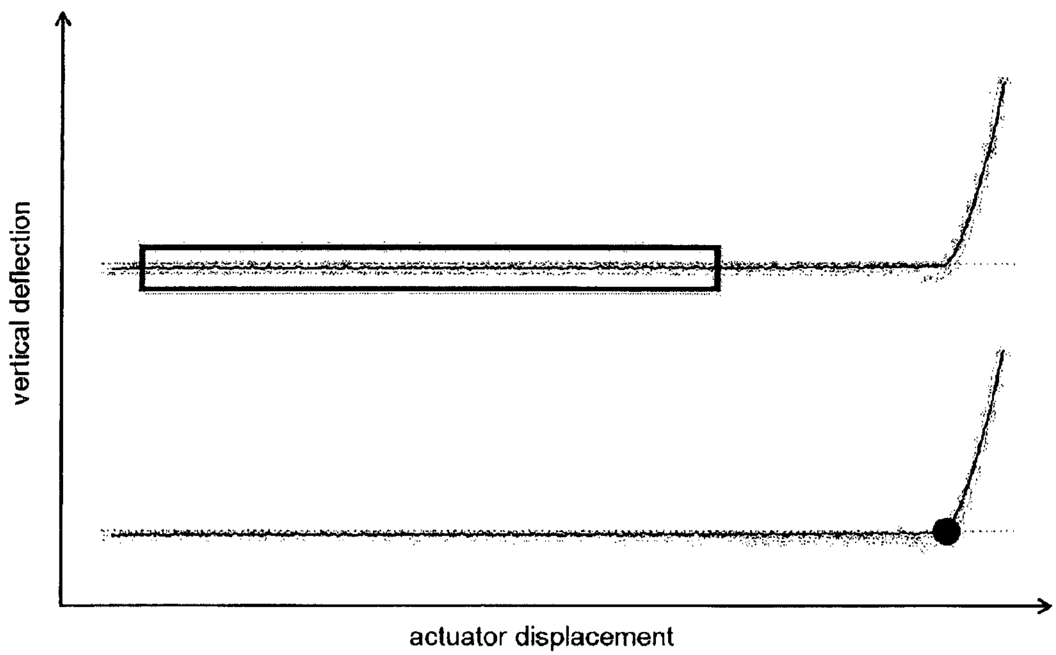
FIG. 13 shows an exemplary force curves with A: unaffected part of the baseline, and B: contact point of the force curve.

Currently there is no dynamic, real-time optimal adjustment of the indentation range. The current approach is conservative: when biological samples are measured maximal expected indentation range is set (e.g. 25 um) regardless of the indentation depth and adhesion. This is enabling out of contact status of the tip at the end of the indentation cycle. However, often some parts of the sample are stiffer with small adhesion where large indentation range is not necessary (FIG. 13).

Reproducible measurements require constant approach and retract velocity what in the case of large indentation range means increased time for each indentation cycle. Based on the standard biological sample measurement where more than 10 000 indentation cycles are performed, dynamic real-time indentation range adjustment is saving substantial time needed for the whole experiment while accuracy is maintained.

Only with the advanced algorithm, which can detect unaffected baseline part in short time, real-time adjustment of the indentation range is possible. The advanced algorithm is directly controlling hardware in order to ensure smooth operation. The algorithm consists of several mathematical equations and concepts.

Particularly, the advanced algorithm comprises the steps of:

1. Force curves are analysed with baseline detection algorithm for sub-scores (see above)
2. Based on the sub-scores, range of the unaffected area is detected (red rectangle in FIG. 13)
3. If the first/initial baseline segment is scored as unaffected (e.g. flat without adhesion) and is larger than 500 nm and without trend of decreasing range down to 900 nm within last three indentation cycles, the cantilever is not adjusted.
4. If the first/initial baseline segment is scored as unaffected (e.g. flat without adhesion) and is larger than 500 nm and with trend of decreasing range down to 900 nm within last three indentation cycles, the indentation range is increased for the values of average decreasing segment within last three indentation cycles.
5. If the first/initial baseline segment is scored as affected (e.g. not flat with adhesion) or is smaller than 500 nm, the indentation cycle of the present spot is repeated for the validation. If after validation baseline segment is scored as affected, the indentation range is increased for 500 nm, otherwise if baseline segment after validation is scored as unaffected, the cantilever is not adjusted.
6. For all detected baseline ranges bigger than 750 nm, the range of indentation cycle is decreased that the first/initial baseline segment is 750 nm long.

Particularly, the contact point algorithm is used in this advanced algorithm since is confining better the area of detection (e.g., excluding deflection part from analysis).

LIST OF REFERENCE ELEMENTS

| | |
|---|---|
| 100 | Atomic force microscope of invention |
| 1 | Piezo element |
| 11 | Maximally retraction |
| 12 | Maximally extension |
| 13 | Optimal working range |
| 14 | Non-optimal working range |
| 15 | Threshold to lift the cantilever |
| 16 | Threshold to lower the cantilever |
| 2 | Cantilever |
| 21 | Cantilever tip |
| 22 | Laser |
| 23 | Mirror |
| 24 | Photodiode |
| 25 | Cantilever holder |
| 3 | Motor |
| 31 | Controller |
| 32 | Second motor (second additional actuator) |
| 33 | Third motor (third additional actuator) |
| 34 | actuator control unit |
| 4 | Sample |
| 41 | Sample holder |
| 51 | Axis along the second direction |
| 52 | Axis along the normal |
| 53 | Point at the surface of the sample (intersection of 51 and 53) |
| R | First direction |
| R2 | Second direction |
| N | Normal |
| α | Angle between 51 and 53 |

The invention claimed is:

1. A method for controlling a scanning probe microscope having a probe (2) with a tip (21) for interacting with a sample (4), and a nanoscanner (1) for retaining said sample (4) or said probe (2), comprising the steps of:

monitoring the extension of said nanoscanner (1) along a first direction (R), along which said tip (21) is moved towards said sample (4), and adjusting a level of said probe (2) along said first direction (R) by means of an additional actuator (3), when said nanoscanner (1) exhibits an extension below or above a threshold value, and further comprising the steps of:

a) measuring a force curve on said sample, wherein said force curve comprises an approaching curve and a retracting curve, b) detecting an optimal baseline part of said force curve, c) optionally detecting a contact point of said force curve, d) comparing said approaching curve and/or said retracting curve with said optimal baseline part, particularly in proximity of said contact point, and e) based on said comparison of step d), adjusting one of: said level of said probe; the lateral position of said probe; or an angle (α), wherein said angle (α) is monitored between a second direction (R2) and the normal (N) of a surface of said sample (4) at a point (53) of said surface, wherein said probe (2) is moving along said second direction (R2) towards said point (53), and said additional actuator (3), and at least a second additional actuator (32) is controlled such that said angle (α) approaches a predefined desired angle, wherein particularly said desired angle is zero.

2. The method according to claim 1, wherein said nanoscanner (1) is a piezo element.

3. The method according to claim 1, wherein said probe (2) is a cantilever.

4. The method according to claim 1, wherein said adjusting is performed by lowering or lifting said probe (2) or by lowering or lifting said sample (4).

5. The method according to claim 1, wherein said level is adjusted when said nanoscanner (1) exhibits an extension lower than 20% or higher than 80% of its maximal extension.

6. The method according to claim 1, wherein said level is adjusted by lowering or lifting said probe (2) or said sample (4) by 10 to 30% of the maximal extension of said nanoscanner (1).

7. The method according to claim 1, wherein said level is adjusted whenever said nanoscanner (1) exhibits an extension that is 50 nm, 100 nm, 200 nm, 500 nm, 700 nm, 1μ or 2 μm smaller than said nanoscanner's maximal extension or larger than said nanoscanner's maximal retraction.

8. The method according to claim 1, wherein said level is adjusted by lowering or lifting said probe (2) or said sample (4) by a distance ranging from 50 nm to 3 μm.

9. The method according to claim 1, wherein said additional actuator (3), said second additional actuator (32) and a third additional actuator (33) are controlled such that said current angle ($\alpha$) approaches said predefined desired angle.

* * * * *